US011804996B2

(12) United States Patent
Abotabl et al.

(10) Patent No.: US 11,804,996 B2
(45) Date of Patent: Oct. 31, 2023

(54) GUARD BANDS FOR RESOURCE BLOCK SETS OF FULL DUPLEX SLOT CONFIGURED BANDWIDTH PARTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 17/470,914

(22) Filed: Sep. 9, 2021

(65) Prior Publication Data

US 2022/0086029 A1 Mar. 17, 2022

Related U.S. Application Data

(60) Provisional application No. 63/079,856, filed on Sep. 17, 2020.

(51) Int. Cl.
*H04L 5/14* (2006.01)
*H04W 72/04* (2023.01)
(Continued)

(52) U.S. Cl.
CPC ............ *H04L 27/2607* (2013.01); *H04L 5/14* (2013.01); *H04W 72/044* (2013.01)

(58) Field of Classification Search
CPC ..... H04L 27/2607; H04L 5/14; H04W 72/044
See application file for complete search history.

(56) References Cited

U.S. PATENT DOCUMENTS

2020/0067690 A1* 2/2020 Park .................. H04W 72/0453
2020/0235980 A1 7/2020 John Wilson et al.
(Continued)

OTHER PUBLICATIONS

"3rd Generation Partnership Project; Technical Specification Group Radio Access Network; NR; Radio Resource Control (RRC) protocol specification (Release 16)," 3GPP Draft, DRAFT_38331-G10, 3rd Generation Partnership Project (3GPP), Mobile Competence Centre, 650, Route Des Lucioles, F-06921, Sophia-Antipolis Cedex, France, Jul. 10, 2020 (Jul. 10, 2020), XP051908538, 897 pages, Retrieved from the Internet: URL: https: https://ftp.3gpp.org/tsg_ran/WG2_RL2/Specifications/202007_draft_specs_after_RAN_88/Draft_38331-g10.docx [retrieved on Jul. 10, 2020], the whole document.

(Continued)

*Primary Examiner* — Kent Krueger
(74) *Attorney, Agent, or Firm* — Norton Rose Fullbright US LLP

(57) ABSTRACT

Systems and methods providing guard bands for resource blocks of full duplex slot configured bandwidth parts (BWPs) are described. One or more guard bands of an intra-cell guard band allocation with respect to a full duplex BWP configuration may be determined using a full duplex guard band message containing information regarding guard bands between RB sets of a BWP when used in a full duplex slot configuration. Additionally or alternatively, one or more guard bands of an intra-cell guard band allocation with respect to a full duplex BWP configuration may be determined using half duplex guard band messages containing information regarding guard bands between RB sets of a BWP when used in a corresponding half duplex slot duplex configuration. Other aspects and features are also claimed and described.

30 Claims, 13 Drawing Sheets

Frequency
402
403
401
Time

(51) Int. Cl.
*H04L 27/26* (2006.01)
*H04W 72/044* (2023.01)

(56) References Cited

U.S. PATENT DOCUMENTS

2022/0116968 A1* 4/2022 Choi ..................... H04L 5/0053
2023/0065090 A1* 3/2023 Kim ...................... H04W 72/51

OTHER PUBLICATIONS

International Search Report and Written Opinion—PCT/US2021/071418—ISA/EPO—dated Jan. 4, 2022 (208347WO).
Moderator (LG Electronics) : "Summary#2 on Maintenance of Wide-Band Operation for NR-U," 3GPP Draft, 3GPP TSG RAN WG1 #101, R1-2004702, 3rd Generation Partnership Project (3GPP), Mobile Competence Centre, 650, Route Des Lucioles, F-06921, Sophia-Antipolis Cedex, France, vol. RAN WG1, No. e-Meeting, May 25, 2020-Jun. 5, 2020, May 25, 2020 (May 25, 2020), XP051890572, 28 pages, Retrieved from the Internet: URL: https://ftp.3gpp.org/tsg_ran/WG1_RL1/TSGR1_101-e/Docs/R1-2004702.zip R1-2004702.docx [retrieved on May 25, 2020], the whole document.

* cited by examiner 402
403
401
Time
Frequency 402
401
Time
Frequency 402
401
Time
Frequency

GUARD BANDS FOR RESOURCE BLOCK SETS OF FULL DUPLEX SLOT CONFIGURED BANDWIDTH PARTS

CROSS-REFERENCE TO RELATED APPLICATIONS

This application claims the benefit of U.S. Provisional Patent Application No. 63/079,856, entitled, "GUARD BANDS FOR RESOURCE BLOCK SETS OF FULL DUPLEX SLOT CONFIGURED BANDWIDTH PARTS," filed on Sep. 17, 2020, the disclosure of which is expressly incorporated by reference herein in its entirety.

TECHNICAL FIELD

Aspects of the present disclosure relate generally to wireless communication systems, and more particularly, to full duplex communication. Certain embodiments of the technology discussed below can enable and provide guard bands for resource blocks of full duplex slot configured bandwidth parts.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. Further, when operating in a full duplex mode, a base station may encounter self-interference associated with transmission of a downlink signal when attempting to receive uplink signals from one or more UE. On the uplink, a transmission from the UE may encounter interference from uplink transmissions of other UEs communicating with the neighbor base stations or from other wireless RF transmitters. Further, when operating in a full duplex mode, a UE may encounter self-interference associated with transmission of an uplink signal when attempting to receive downlink signals from a base station. This interference may degrade performance on both the downlink and uplink. Moreover, as the demand for mobile broadband access continues to increase, the possibilities of interference and congested networks grows with more UEs accessing the long-range wireless communication networks and more short-range wireless systems being deployed in communities.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include receiving a full duplex guard band message containing information regarding guard bands between resource block (RB) sets of a bandwidth part (BWP) when used in a full duplex slot configuration, wherein the full duplex guard band message includes a first plurality of low and high RB index pairs each RB index pair defining a respective guard band of the full duplex slot configuration. The method may further include determining the RB sets for full duplex communication using the full duplex slot configuration with respect to the BWP when used in the full duplex slot configuration based at least in part on the full duplex guard band message.

In an additional aspect of the disclosure, a method of wireless communication is provided. The method may include receiving a full duplex guard band message containing information regarding a first one or more guard bands between RB sets of a BWP when used in a full duplex slot configuration. The full duplex guard band message may include a first plurality of low and high RB index pairs. Each low and high RB index pair of the first plurality of low and high index pairs may define a respective guard band of the full duplex slot configuration. The method may further include performing full duplex communication in accordance with the full duplex slot configuration with respect to the BWP using first RB sets for the full duplex communication corresponding at least in part to the full duplex guard band message.

In an additional aspect of the disclosure, an apparatus for wireless communication is provided. The apparatus may include means for receiving a full duplex guard band message containing information regarding guard bands between RB sets of a BWP when used in a full duplex slot configuration, wherein the full duplex guard band message includes a first plurality of low and high RB index pairs each RB index pair defining a respective guard band of the full duplex slot configuration. The apparatus may further include means for determining the RB sets for full duplex communication using the full duplex slot configuration with respect to the BWP when used in the full duplex slot configuration based at least in part on the full duplex guard band message.

In an additional aspect of the disclosure, an apparatus for wireless communication is provided. The apparatus may include means for receiving a full duplex guard band message containing information regarding a first one or more guard bands between RB sets of a BWP when used in a full duplex slot configuration. The full duplex guard band message may include a first plurality of low and high RB index pairs. Each low and high RB index pair of the first plurality of low and high index pairs may define a respective guard band of the full duplex slot configuration. The apparatus may further include means for performing full duplex communication in accordance with the full duplex slot configuration with respect to the BWP using first RB sets for the full duplex communication corresponding at least in part to the full duplex guard band message.

In an additional aspect of the disclosure, a non-transitory computer-readable medium having program code recorded thereon for wireless communication is provided. The program code may include code to receive a full duplex guard band message containing information regarding guard bands between RB sets of a BWP when used in a full duplex slot configuration, wherein the full duplex guard band message includes a first plurality of low and high RB index pairs each RB index pair defining a respective guard band of the full duplex slot configuration. The program code may further include code to determine the RB sets for full duplex communication using the full duplex slot configuration with respect to the BWP when used in the full duplex slot configuration based at least in part on the full duplex guard band message.

In an additional aspect of the disclosure, a non-transitory computer-readable medium having program code recorded thereon for wireless communication is provided. The program code may include code to receive a full duplex guard band message containing information regarding a first one or more guard bands between RB sets of a BWP when used in a full duplex slot configuration. The full duplex guard band message may include a first plurality of low and high RB index pairs. Each low and high RB index pair of the first plurality of low and high index pairs may define a respective guard band of the full duplex slot configuration. The program code may further include code to perform full duplex communication in accordance with the full duplex slot configuration with respect to the BWP using first RB sets for the full duplex communication corresponding at least in part to the full duplex guard band message.

In an additional aspect of the disclosure, an apparatus configured for wireless communication is provided. The apparatus includes at least one processor, and a memory coupled to the processor. The processor may be configured to receive a full duplex guard band message containing information regarding guard bands between RB sets of a BWP when used in a full duplex slot configuration, wherein the full duplex guard band message includes a first plurality of low and high RB index pairs each RB index pair defining a respective guard band of the full duplex slot configuration. The processor may further be configured to determine the RB sets for full duplex communication using the full duplex slot configuration with respect to the BWP when used in the full duplex slot configuration based at least in part on the full duplex guard band message.

In an additional aspect of the disclosure, an apparatus configured for wireless communication is provided. The apparatus includes at least one processor, and a memory coupled to the processor. The processor may be configured to receive a full duplex guard band message containing information regarding a first one or more guard bands between RB sets of a BWP when used in a full duplex slot configuration. The full duplex guard band message may include a first plurality of low and high RB index pairs. Each low and high RB index pair of the first plurality of low and high index pairs may define a respective guard band of the full duplex slot configuration. The processor may further be configured to perform full duplex communication in accordance with the full duplex slot configuration with respect to the BWP using first RB sets for the full duplex communication corresponding at least in part to the full duplex guard band message.

In some examples of the method, the apparatuses, and the article including non-transitory computer-readable medium described herein, the RB index pairs of the full duplex guard band message define guard bands of the full duplex slot configuration regardless of a direction of RB sets of the full duplex slot configuration adjacent to the guard bands.

In some examples of the method, the apparatuses, and the article including non-transitory computer-readable medium described herein, at least one low and high RB index pair of the RB index pairs of the full duplex guard band message includes a first RB index corresponding to a downlink RB index and a second RB index corresponding to an uplink RB index to define a guard band between a downlink RB set and an uplink RB set of the full duplex slot configuration.

In some examples of the method, the apparatuses, and the article including non-transitory computer-readable medium described herein, determining the RB sets for full duplex communication using the full duplex slot configuration with respect to the BWP is based at least in part on a start RB index corresponding to a beginning RB of the BWP and an end RB index corresponding to an ending RB of the BWP.

In some examples of the method, the apparatuses, and the article including non-transitory computer-readable medium described herein, the full duplex guard band message is received in radio resource control (RRC) signaling.

In some examples of the method, the apparatuses, and the article including non-transitory computer-readable medium described herein, at least one RB set of the RB sets for full duplex communication using the full duplex slot configuration defined by RB indices of the full duplex guard band message is split into a downlink and uplink RB set of the full duplex slot configuration.

In some examples of the method, the apparatuses, and the article including non-transitory computer-readable medium described herein, at least one RB set of the RB sets for full duplex communication using the full duplex slot configuration is an in-band full duplex RB set, and RB indices of the first plurality of low and high RB index pairs are used in determining the in-band full duplex RB set for full duplex communication using the full duplex slot configuration.

In some examples of the method, the apparatuses, and the article including non-transitory computer-readable medium described herein, an uplink guard band message containing information regarding guard bands between RB sets of a BWP when used in an uplink half duplex slot configuration is received, wherein the uplink guard band message includes a second plurality of low and high RB index pairs each RB index pair defining a respective guard band of the uplink half duplex slot configuration, and a downlink guard band message containing information regarding guard bands between RB sets of the BWP when used in a downlink half duplex slot configuration is, wherein the downlink guard band message includes a third plurality of low and high RB index pairs each RB index pair defining a respective guard band of the downlink half duplex slot configuration, and wherein at least one RB set of the RB sets for full duplex communication using the full duplex slot configuration is an in-band full duplex RB set, and wherein RB indices of the first plurality of low and high RB index pairs are used in determining the in-band full duplex RB set for full duplex communication using the full duplex slot configuration, RB indices of the second plurality of low and high RB index pairs are used in determining an uplink RB set for full duplex communication using the full duplex slot configuration, and RB indices of the third plurality of low and high RB index pairs are used in determining a downlink RB set for full duplex communication using the full duplex slot configuration.

In some examples of the method, the apparatuses, and the article including non-transitory computer-readable medium described herein, an uplink guard band message containing information regarding guard bands between RB sets of a BWP when used in an uplink half duplex slot configuration is received, wherein the uplink guard band message includes a second plurality of low and high RB index pairs each RB index pair defining a respective guard band of the uplink half duplex slot configuration, and a downlink guard band message containing information regarding guard bands between RB sets of the BWP when used in a downlink half duplex slot configuration is received, wherein the downlink guard band message includes a third plurality of low and high RB index pairs each RB index pair defining a respective guard band of the downlink half duplex slot configuration, and wherein at least one RB set of the RB sets for full duplex communication using the full duplex slot configuration is an in-band full duplex RB set, and wherein RB indices of the second plurality of low and high RB index pairs or RB indices of the third plurality of low and high RB index pairs are used in determining the in-band full duplex RB set for full duplex communication using the full duplex slot configuration.

In one aspect of the disclosure, a method of wireless communication is provided. The method may include receiving an uplink guard band message containing information regarding guard bands between RB sets of a BWP when used in an uplink half duplex slot configuration, wherein the uplink guard band message includes a first plurality of low and high RB index pairs each RB index pair defining a respective guard band of the uplink half duplex slot configuration, and receiving a downlink guard band message containing information regarding guard bands between RB sets of the BWP when used in a downlink half duplex slot configuration, wherein the downlink guard band message includes a second plurality of low and high RB index pairs each RB index pair defining a respective guard band of the downlink half duplex slot configuration. The method may further include determining RB sets for full duplex communication using a full duplex slot configuration with respect to the BWP when used in the full duplex slot configuration based at least in part on the uplink guard band message and the downlink guard band message.

In an additional aspect of the disclosure, a method of wireless communication is provided. The method may include receiving an uplink guard band message containing information regarding a first one or more guard bands between RB sets of a BWP when used in an uplink half duplex slot configuration. The uplink guard band message may include a first plurality of low and high RB index pairs. Each low and high RB index pair of the first plurality of low and high RB index pairs may define a respective guard band of the uplink half duplex slot configuration. The method may also include receiving a downlink guard band message containing information regarding a second one or more guard bands between the RB sets of the BWP when used in a downlink half duplex slot configuration. The downlink guard band message may include a second plurality of low and high RB index pairs. Each low and high RB index pair of the second plurality of low and high RB index pairs may define a respective guard band of the downlink half duplex slot configuration. The method may further include performing full duplex communication in accordance with a full duplex slot configuration with respect to the BWP using first RB sets for the full duplex communication corresponding at least in part to the uplink guard band message and the downlink guard band message.

In an additional aspect of the disclosure, an apparatus for wireless communication is provided. The apparatus may include means for receiving an uplink guard band message containing information regarding guard bands between RB sets of a BWP when used in an uplink half duplex slot configuration, wherein the uplink guard band message includes a first plurality of low and high RB index pairs each RB index pair defining a respective guard band of the uplink half duplex slot configuration, and means for receiving a downlink guard band message containing information regarding guard bands between RB sets of the BWP when used in a downlink half duplex slot configuration, wherein the downlink guard band message includes a second plurality of low and high RB index pairs each RB index pair defining a respective guard band of the downlink half duplex slot configuration. The apparatus may further include means for determining RB sets for full duplex communication using a full duplex slot configuration with respect to the BWP when used in the full duplex slot configuration based at least in part on the uplink guard band message and the downlink guard band message.

In an additional aspect of the disclosure, an apparatus for wireless communication is provided. The apparatus may include means for receiving an uplink guard band message containing information regarding a first one or more guard bands between RB sets of a BWP when used in an uplink half duplex slot configuration. The uplink guard band message may include a first plurality of low and high RB index pairs. Each low and high RB index pair of the first plurality of low and high RB index pairs may define a respective guard band of the uplink half duplex slot configuration. The apparatus may also include means for receiving a downlink guard band message containing information regarding a second one or more guard bands between RB sets of the BWP when used in a downlink half duplex slot configuration. The downlink guard band message may include a second plurality of low and high RB index pairs. Each low and high RB index pair of the second plurality of low and high RB index pairs may define a respective guard band of the downlink half duplex slot configuration. The apparatus may further include means for performing full duplex communication in accordance with a full duplex slot configuration with respect to the BWP using first RB sets for the full duplex communication corresponding at least in part to the uplink guard band message and the downlink guard band message.

In an additional aspect of the disclosure, a non-transitory computer-readable medium having program code recorded thereon. The program code may include code to receive an uplink guard band message containing information regarding guard bands between RB sets of a BWP when used in an uplink half duplex slot configuration, wherein the uplink guard band message includes a first plurality of low and high RB index pairs each RB index pair defining a respective guard band of the uplink half duplex slot configuration, and receive a downlink guard band message containing information regarding guard bands between RB sets of the BWP when used in a downlink half duplex slot configuration, wherein the downlink guard band message includes a second plurality of low and high RB index pairs each RB index pair defining a respective guard band of the downlink half duplex slot configuration. The program code may further include code to determine RB sets for full duplex communication using a full duplex slot configuration with respect to the BWP when used in the full duplex slot configuration based at least in part on the uplink guard band message and the downlink guard band message.

In an additional aspect of the disclosure, a non-transitory computer-readable medium having program code recorded thereon. The program code may include code to receive an uplink guard band message containing information regarding a first one or more guard bands between RB sets of a BWP when used in an uplink half duplex slot configuration. The uplink guard band message may include a first plurality of low and high RB index pairs. Each low and high RB index pair of the first plurality of low and high RB index pairs may define a respective guard band of the uplink half duplex slot configuration. The program code may also include code to receive a downlink guard band message containing information regarding a second one or more guard bands between RB sets of the BWP when used in a downlink half duplex slot configuration. The downlink guard band message may include a second plurality of low and high RB index pairs. Each low and high RB index pair of the second plurality of low and high RB index pairs may define a respective guard band of the downlink half duplex slot configuration. The program code may further include code to perform full duplex communication in accordance with a full duplex slot configuration with respect to the BWP using first RB sets for the full duplex communication corresponding at least in part to the uplink guard band message and the downlink guard band message.

In an additional aspect of the disclosure, an apparatus configured for wireless communication is provided. The apparatus includes at least one processor, and a memory coupled to the processor. The processor may be configured to receive an uplink guard band message containing information regarding guard bands between RB sets of a BWP when used in an uplink half duplex slot configuration, wherein the uplink guard band message includes a first plurality of low and high RB index pairs each RB index pair defining a respective guard band of the uplink half duplex slot configuration, and receive a downlink guard band message containing information regarding guard bands between RB sets of the BWP when used in a downlink half duplex slot configuration, wherein the downlink guard band message includes a second plurality of low and high RB index pairs each RB index pair defining a respective guard band of the downlink half duplex slot configuration. The processor may further be configured to determine RB sets for full duplex communication using a full duplex slot configuration with respect to the BWP when used in the full duplex slot configuration based at least in part on the uplink guard band message and the downlink guard band message.

In an additional aspect of the disclosure, an apparatus configured for wireless communication is provided. The apparatus includes at least one processor, and a memory coupled to the processor. The processor may be configured to receive an uplink guard band message containing information regarding a first one or more guard bands between RB sets of a BWP when used in an uplink half duplex slot configuration. The uplink guard band message may include a first plurality of low and high RB index pairs. Each low and high RB index pair of the first plurality of low and high RB index pairs may define a respective guard band of the uplink half duplex slot configuration. The processor may also be configured to receive a downlink guard band message containing information regarding a second one or more guard bands between RB sets of the BWP when used in a downlink half duplex slot configuration. The downlink guard band message may include a second plurality of low and high RB index pairs and each RB index pair of the second plurality of low and high RB index pairs may define a respective guard band of the downlink half duplex slot configuration. The processor may further be configured to perform full duplex communication in accordance with a full duplex slot configuration with respect to the BWP using first RB sets for the full duplex communication corresponding at least in part to the uplink guard band message and the downlink guard band message.

In some examples of the method, the apparatuses, and the article including non-transitory computer-readable medium described herein, at least one low and high RB index pair of the RB index pairs of the uplink guard band message includes a first RB index corresponding to an uplink RB index, wherein at least one low and high RB index pair of the RB index pairs of the downlink guard band message includes a second RB index corresponding to a downlink RB index, and wherein the first RB index and the second RB index define a guard band between a downlink RB set and an uplink RB set of the full duplex slot configuration.

In some examples of the method, the apparatuses, and the article including non-transitory computer-readable medium described herein, determining the RB sets for full duplex communication using the full duplex slot configuration with respect to the BWP is based at least in part on a start RB index corresponding to a beginning RB of the BWP and an end RB index corresponding to an ending RB of the BWP.

In some examples of the method, the apparatuses, and the article including non-transitory computer-readable medium described herein, the uplink guard band message and the downlink guard band message are received in RRC signaling.

In some examples of the method, the apparatuses, and the article including non-transitory computer-readable medium described herein, at least one RB set of the RB sets for full duplex communication using the full duplex slot configuration defined by RB indices of the uplink guard band message and the downlink guard band message is split into a downlink and uplink RB set of the full duplex slot configuration.

In some examples of the method, the apparatuses, and the article including non-transitory computer-readable medium described herein, at least one RB set of the RB sets for full duplex communication using the full duplex slot configuration is an in-band full duplex RB set, and wherein RB indices of the first plurality of low and high RB index pairs are used in determining the in-band full duplex RB set for full duplex communication using the full duplex slot configuration.

In some examples of the method, the apparatuses, and the article including non-transitory computer-readable medium described herein, a full duplex guard band message containing information regarding guard bands between RB sets of a BWP when used in a full duplex slot configuration is received, wherein the full duplex guard band message includes a third plurality of low and high RB index pairs each RB index pair defining a respective guard band of the full duplex slot configuration, and wherein at least one RB set of the RB sets for full duplex communication using the full duplex slot configuration is an in-band full duplex RB set, and wherein RB indices of the third plurality of low and high RB index pairs are used in determining the in-band full duplex RB set for full duplex communication using the full duplex slot configuration, RB indices of the first plurality of low and high RB index pairs are used in determining an uplink RB set for full duplex communication using the full duplex slot configuration, and RB indices of the second plurality of low and high RB index pairs are used in determining a downlink RB set for full duplex communication using the full duplex slot configuration.

In some examples of the method, the apparatuses, and the article including non-transitory computer-readable medium described herein, at least one RB set of the RB sets for full duplex communication using the full duplex slot configuration is an in-band full duplex RB set, and wherein RB indices of the first plurality of low and high RB index pairs or RB indices of the second plurality of low and high RB index pairs are used in determining the in-band full duplex RB set for full duplex communication using the full duplex slot configuration.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
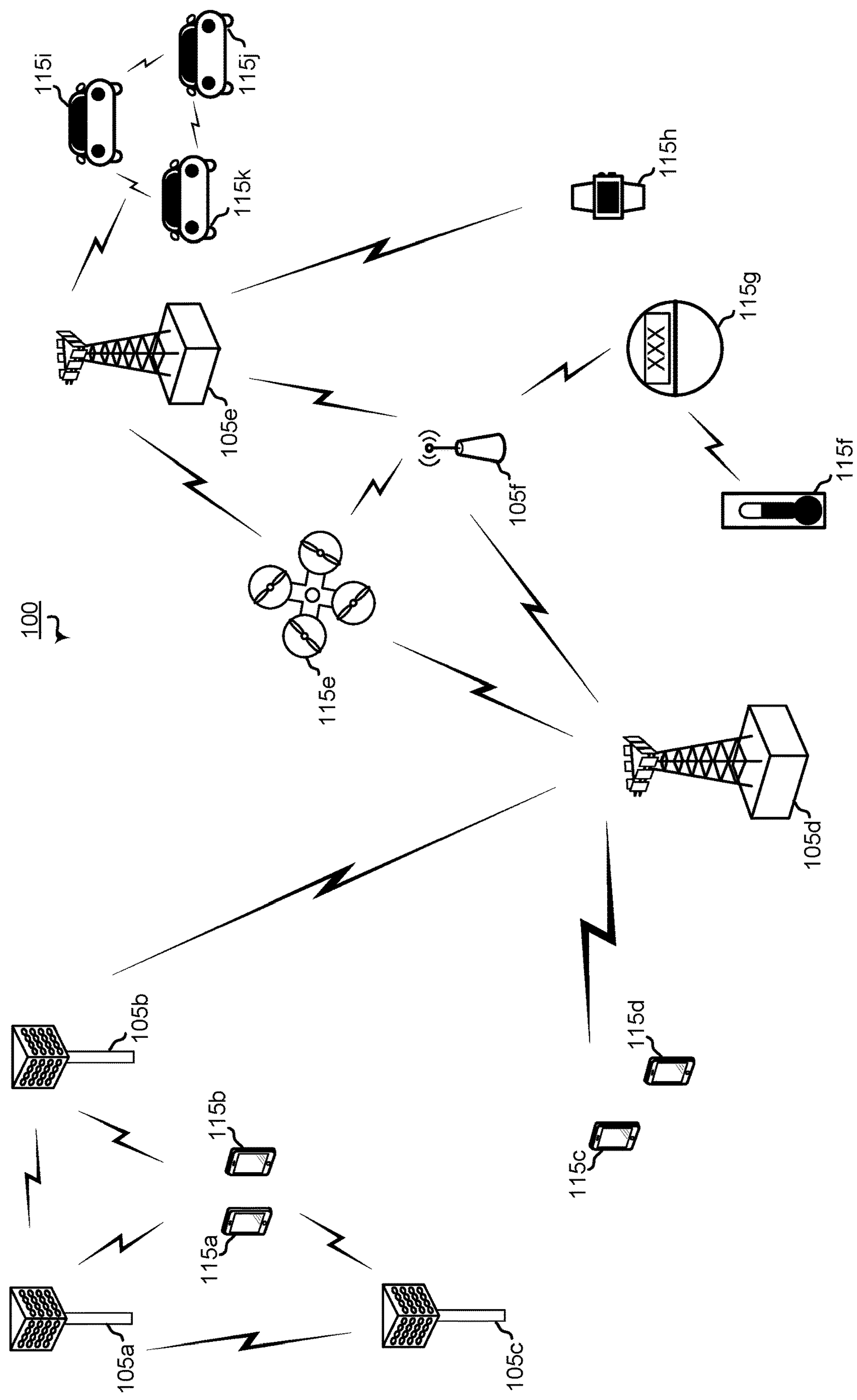
FIG. 1 is a block diagram illustrating details of a wireless communication system according to aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., 10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
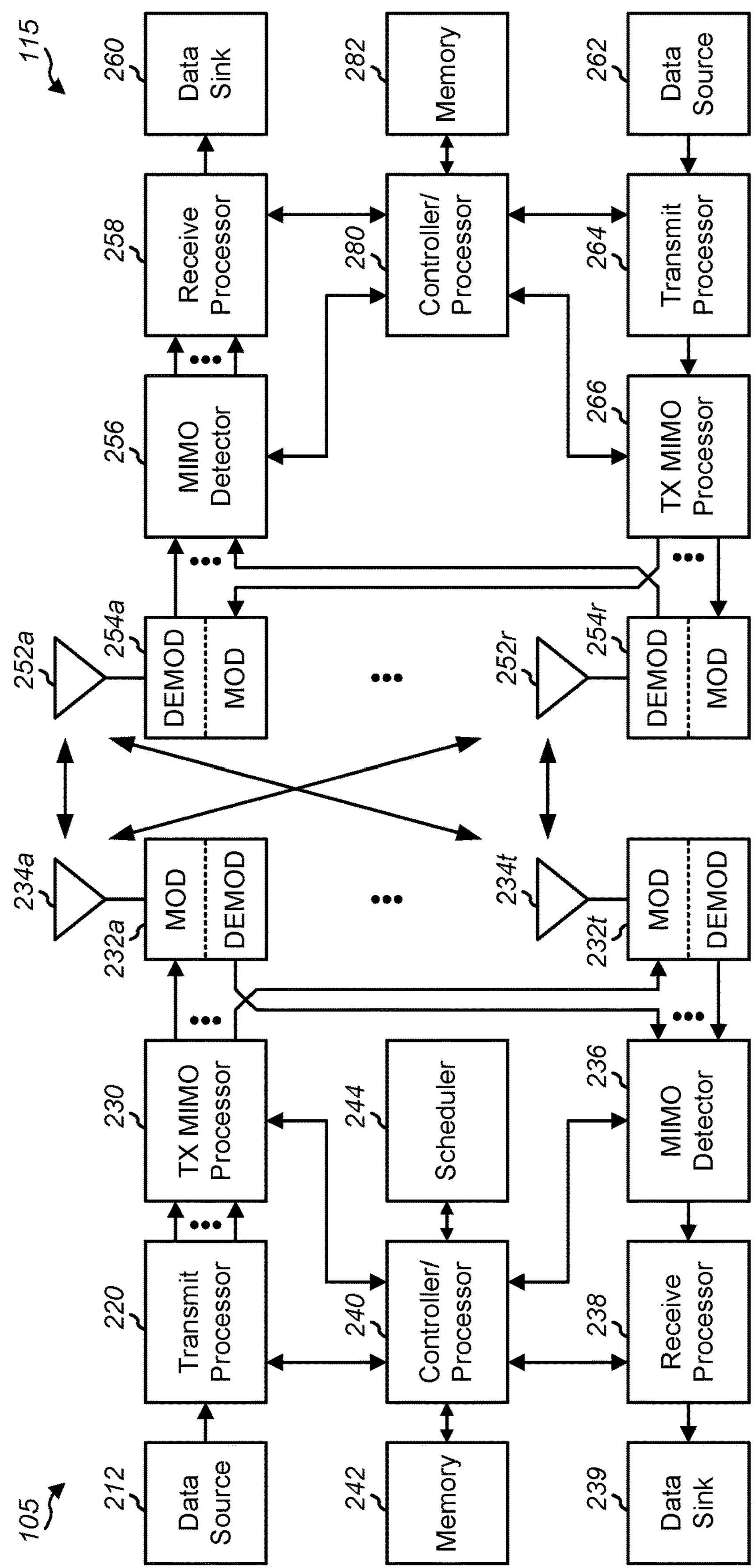
FIG. 2 is a block diagram conceptually illustrating a design of a base station and a user equipment (UE) configured according to aspects of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f* Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, the antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 7 and 9, and/or other processes for the techniques described herein. Memories 242 and 282 may store data and program codes for base station 105 and UE 115, respectively. Scheduler 244 may schedule UEs for data transmission on the downlink and/or uplink.

Wireless devices of wireless network 100 may use various duplex modes for communications. For example, a wireless device may implement a full duplex mode or a half duplex mode with respect to any particular communication link.

Figure 3B:
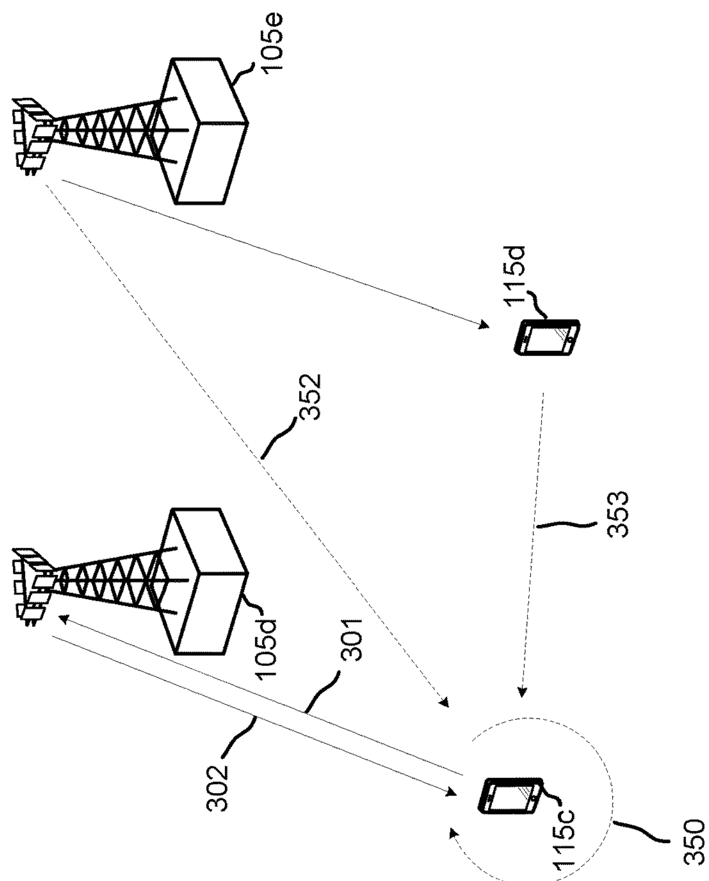
FIGS. 3A-3C illustrate full duplex wireless communications modes according to aspects of the present disclosure.
Figure 3A:
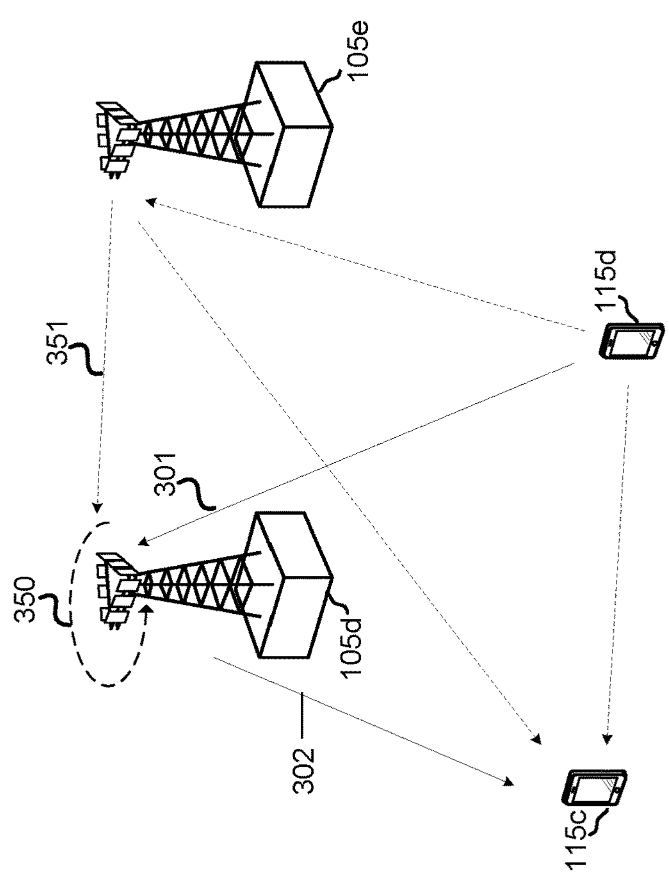
Figure 3C:
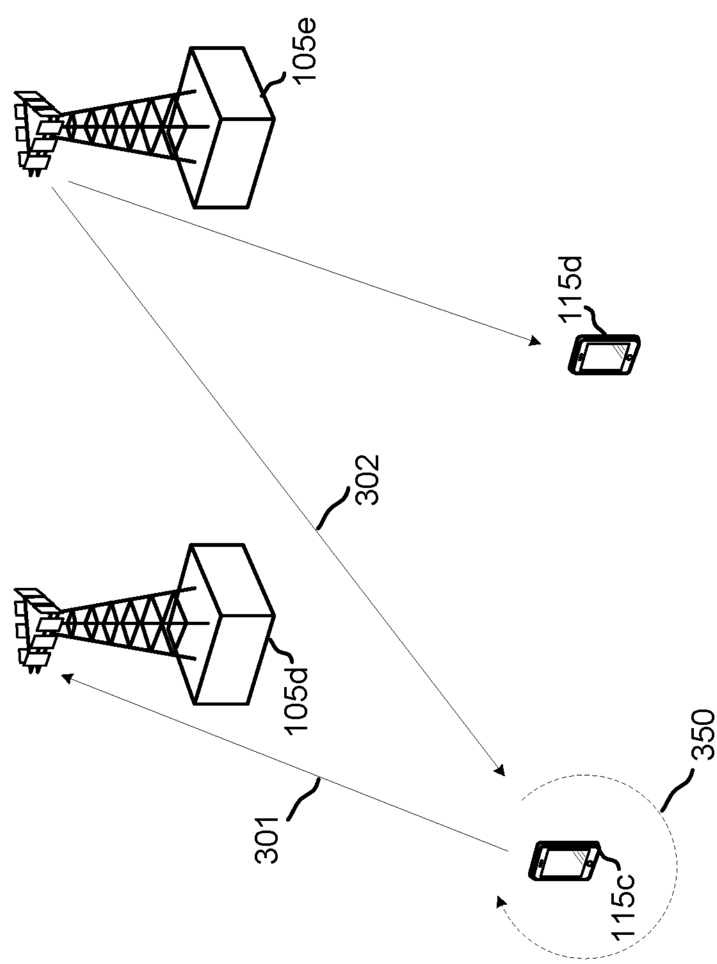

FIGS. 3A-3C illustrate examples in which full duplex wireless communications modes are implemented by at least one wireless device of particular communication links. It should be appreciated that FIGS. 3A-3C represent a portion of wireless network 100 selected for illustrating full duplex communications and that the particular base stations and UEs depicted are not intended to be limiting with respect to the various wireless communication stations that may operate in a full duplex communication mode or that may implement full duplex slot formats according to concepts of the disclosure.

In the example of FIG. 3A, base stations **105*d* and 105*e* are each operating in a full duplex mode while UEs 115*c* and 115*d* are each operating in a half duplex mode. In this example, base station 105*d* receives uplink signal 301 and transmits downlink signal 302 using a shared time resource, and possibly a shared frequency resource. Correspondingly, UE 115*d* transmits uplink signal 301 and UE 115*c* receives downlink signal 302 sharing a time resource, and possibly sharing a frequency resource. Base station 105*d* may experience self-interference 350 associated with transmission of downlink signal 302 when attempting to receive uplink signal 301, in addition to external interference (e.g., interference 351 from base station 105*e***).

In the example of FIG. 3B, base station **105*d* and UE 115*c* are each operating in a full duplex mode. In this example, base station 105*d* receives uplink signal 301 and transmits downlink signal 302 using a shared time resource, and possibly a shared frequency resource. Correspondingly, UE 115*c* transmits uplink signal 301 and receives downlink signal 302 using a shared time resource, and possibly a shared frequency resource. In addition to self-interference experienced by base station 105*d*, as described above, UE 115*c* may experience self-interference 350 associated with transmission of uplink signal 301 when attempting to receive downlink signal 302, in addition to external interference (e.g., interference 352 from base station 105*e* and interference 353 from UE 115*d***).

In the example of FIG. 3C, UE **115*c* is operating in a full duplex mode (e.g., implementing a multiple transmission and reception (multi-TRP) architecture). As with the example of FIG. 3B, UE 115*c* transmits uplink signal 301 and receives downlink signal 302 using a shared time resource, and possibly a shared frequency resource. As described above, UE 115*c* may experience self-interference 350 associated with transmission of uplink signal 301 when attempting to receive downlink signal 302**.

Figures 4A, 4B, 4C:
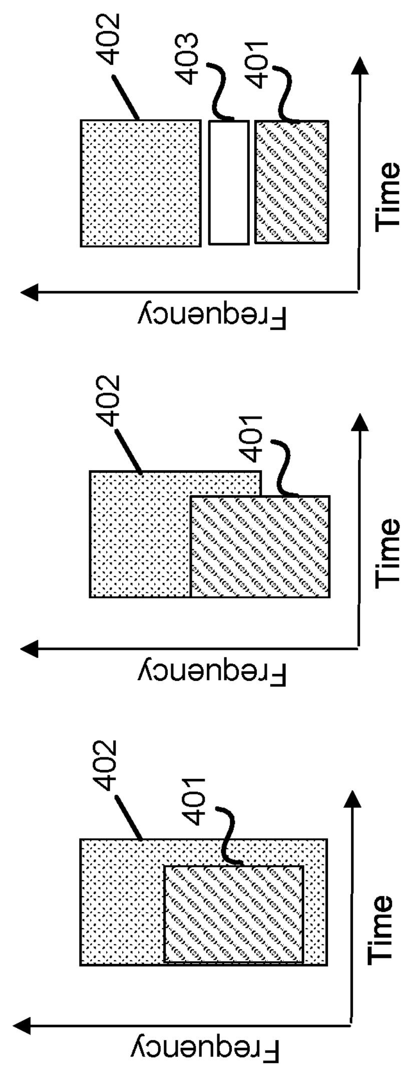
FIGS. 4A-4C illustrate various configurations of full duplex modes as may be utilized by wireless communication stations according to aspects of the present disclosure.

FIGS. 4A-4C illustrate various configurations of full duplex modes as may be utilized by wireless devices of wireless network 100. It should be appreciated that FIGS. 4A-4C present examples with respect to full duplex mode configurations that may be utilized and are not intended to be limiting with respect to the particular duplex mode configurations that may be utilized by wireless communication stations that may implement full duplex slot formats according to concepts of the disclosure.

As can be seen in FIGS. 4A-4C, uplink signals 401 of the full duplex modes overlap downlink signals 402 in time. That is, a wireless communication station implementing a full duplex mode with respect to wireless communications transmits and receives at the same time. In contrast, a wireless communication station implementing a half duplex mode with respect to wireless communications transmits and receives at different times.

Different configurations may be utilized with respect to a full duplex mode, as represented by the examples of FIGS. 4A-4C. For example, FIGS. 4A and 4B show examples of in-band full duplex, wherein uplink signals 401 of the full duplex modes overlap downlink signals 402 in time and frequency. That is the uplink signals and downlink signals at least partially share the same time and frequency resources (e.g., full or partial overlap of the uplink and downlink signals in the time and frequency domains). In another configuration of a full duplex mode, FIG. 4C shows an example of sub-band full duplex, wherein uplink signal 401 of the full duplex mode overlaps downlink signal 402 in time, but not in frequency. That is the uplink signals and downlink signals at least partially share the same time resource (e.g., full or partial overlap of the uplink and downlink signals in the time domain), but do not share the same frequency resource. In the example illustrated in FIG. 4C, uplink signal 401 and downlink signal 402 are separated in the frequency domain by guard band 403 (e.g., a relatively narrow amount of frequency spectrum separating the frequency band occupied by the uplink and downlink signals).

In some cases, wireless devices of wireless network 100 may operate in a shared radio frequency spectrum band, which may include licensed or unlicensed (e.g., contention-based) frequency spectrum. An unlicensed band may, for example, share spectrum with other technologies. In an unlicensed frequency portion of the shared radio frequency spectrum band, UEs 115 or base stations 105 may perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available.

A LBT procedure may include an energy detection technique to determine whether there are any other active transmissions. For example, a device may infer that a change in a received signal strength indicator (RSSI) of a power meter indicates that a channel is occupied. Signal power that is concentrated in a certain bandwidth and exceeds a predetermined noise floor may, in some examples, indicate the channel is occupied by another wireless transmitter. If the detected energy is less than a given threshold, it may be concluded that the channel is available and the node can use the channel for transmission. Alternatively, if the detected energy is more than a given threshold, it may be concluded that the channel is occupied and the node is to back-off and perform another LBT until the channel is available. In some cases, a LBT procedure may include a wireless node adjusting its own backoff window based on the amount of energy detected on a channel and/or the acknowledge/negative-acknowledge (ACK/NACK) feedback for its own transmitted packets as a proxy for collisions.

A LBT procedure may additionally or alternatively include detection of specific sequences that indicate use of the channel. For example, another device may transmit a specific preamble prior to transmitting a data sequence.

Relatively large bandwidths may be available for use in wireless communications between devices of wireless network 100 For example, 5G NR provides for component carrier bandwidths up to 100 MHz in frequency range 1 (FR1: 450 MHz to 6 GHz), or up to 400 MHz in frequency range 2 (FR2: 24.25 GHz to 52.6 GHz) that can be aggregated with a maximum bandwidth of 800 MHz. However, many UEs may not be capable of using the full extent of available bandwidths (e.g., UE capabilities may vary, conditions may create challenges with respect to use of a large bandwidth by a UE, etc.). Accordingly, bandwidth parts (BWPs) may be utilized to subdivide the bandwidth of a component carrier to be used for different purposes. For example, BWPs may be used for multiplexing different signals and signal types for better utilization and adaptation of spectrum and UE power.

A BWP is a set of contiguous resource blocks (RBs) configured inside a channel bandwidth. The width of a BWP may smaller than or equal to the cell bandwidth. BWP configuration parameters include numerology, frequency location, bandwidth size, and control resource set (CORESET).

BWPs may be utilized with respect to slots of a transmission frame structure. The subframes of a transmission frame structure may, for example, include one or more slots (e.g., time slots) containing symbols (e.g., each slot of a subframe may contain 14 symbols), wherein the slots may be utilized for uplink or downlink transmission of their respective symbols. Accordingly, 5G wireless networks typically provide an uplink slot format providing for uplink only symbols, a downlink slot format providing for downlink only symbols, and a flexible slot format providing for either uplink only symbols or downlink only symbols. The slot format with respect to a particular BWP may be established using a predetermined set of parameters. In operation according to 5G NR Release 16, for example, the SFI-index field in DCI format 2_0 may be used to indicate, to a UE on a serving cell, a combination of slot formats that includes a combination of slot formats for a reference downlink BWP and a combination of slot formats for a reference uplink BWP of the serving cell.

When a component carrier is used for transmission in unlicensed spectrum, it is possible that some segments of the band are not available for this carrier (e.g., due to the presence of interfering signals). Accordingly, one or more segments within a BWP may be defined as LBT bandwidth that are separated by guard bands (referred to as intra-cell guard bands). RBs of the contiguous RBs of a BWP may be used to form one or more intra-cell guard bands providing frequency spectrum separating the frequency bands occupied by signals transmitted via the component carrier. For a component carrier with intra-cell guard bands, the UE does not expect that the dedicated BWP is configured to include certain parts of a RB set.

Figure 5:
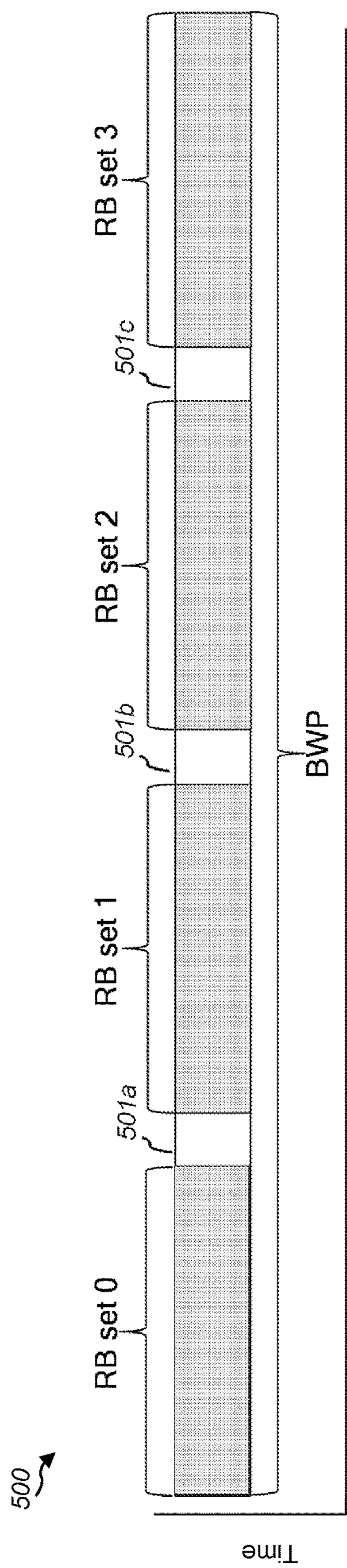
FIG. 5 is a block diagram illustrating an example of a bandwidth part (BWP) comprising a contiguous plurality of resource blocks (RBs) in which intra-cell guard bands have been defined according to aspects of the present disclosure.

FIG. 5 shows an example of BWP 500 comprising a contiguous plurality of RBs in which intra-cell guard bands 501*a*-501*c* have been defined, thus resulting in RB set 0, RB set 1, RB set 2, and RB set 3 being available for signal transmission (e.g., RBs of each of the RB sets being configured according to a particular slot format for respective half duplex transmission of symbols). RB set 0, RB set 1, RB set 2, and RB set 3 of BWP 500 comprise the RBs available for signal transmission, and thus correspond to the signal transmission bandwidths within the BWP. In a situation in which BWP 500 is a subdivision of a shared radio frequency spectrum band component carrier, RB set 0, RB set 1, RB set 2, and RB set 3 correspond to the bandwidths for which LBT procedure may be performed prior to communicating in order to determine whether those portions of the shared channel are available.

In operation according to 5G NR Release 16, for a carrier with intra-cell guard bands, a UE may be configured with the radio resource control (RRC) parameters intraCellGuardBandUL-r16 for a half duplex uplink carrier and intraCellGuardBandDL-r16 for a half duplex downlink carrier. If so configured, a UE may determine the number of RB sets and the available physical resource blocks (PRBs) in each RB set for downlink (e.g., RB set 0, RB set 1, RB set 2, and RB set 3 are each configured according to a downlink slot format) based on the intraCellGuardBandDL-r16 parameter and uplink (e.g., RB set 0, RB set 1, RB set 2, and RB set 3 are each configured according to an uplink slot format) based on the intraCellGuardBandUL-r16 parameter. For example, the intraCellGuardBandDL-r16 and intraCellGuardBandUL-r16 parameters may provide lists of intra-carrier guard-bands per cell, such as may be given as $\{GB_1^{low}, GB_1^{high}\} \ldots, \{GB_{N-1}^{low}, GB_{N-1}^{high}\}$ (e.g., as provided separately for downlink and uplink), where GB is given by carrier resource block (CRB) index. Using such CRB indices, a UE may determine the number (N) of RB sets for a cell and the available PRBs in each RB set (e.g., $[RB_{start}\, GB_1^{low}, -1]$ for RB set 0, $[GB_1^{high}+1, GB_2^{low}-1]$ for RB set 1, . . . $[GB_{N-1}^{high}+1, RB_{end}]$ for RB set N, where $RB_{start}$ and $RB_{end}$ correspond to starting and ending RB indices of the cell, respectively). That is, the intra-cell guard bands separate RB sets, each defined by start and end CRB. If not configured the intraCellGuardBandDL-r16 and intraCellGuardBandUL-r16 parameters, $\{GB_1^{low}, GB_1^{high}\} \ldots, \{GB_{N-1}^{low}, GB_{N-1}^{high}\}$ may be derived from the RAN4 specifications.

Although 5G NR Release 16 provides for intra-cell guard bands with respect RB sets of BWPs configured for half duplex operation (e.g., separately for uplink and downlink using intraCellGuardBandDL-r16 and intraCellGuardBandUL-r16 parameters), the specification does not provide for intra-cell guard bands with respect to RB sets of BWPs configured for full duplex operation. Techniques enabling and providing guard bands for resource blocks of full duplex slot configured bandwidth parts are provided according to aspects of the present disclosure.

In accordance with some aspects of the disclosure, an intra-cell guard band allocation with respect to a full duplex BWP configuration may be determined using a full duplex guard band message containing information regarding guard bands between RB sets of a BWP when used in a full duplex slot configuration. For example, an intraCellGuardBandFD message may be configured to contain information regarding one or more guard bands between the RB sets in case of full duplex operation, regardless of the RB set direction configuration (e.g., guard bands between RBs of a RB set configured for uplink symbols, RBs of a RB set configured for downlink symbols, and/or RBs of a RB set configured for a combination of uplink symbols and downlink symbols). A full duplex guard band message may, for example, include a plurality of low and high RB index pairs such that each RB index pair defines a respective guard band within the BWP for the full duplex operation.

Figure 6:
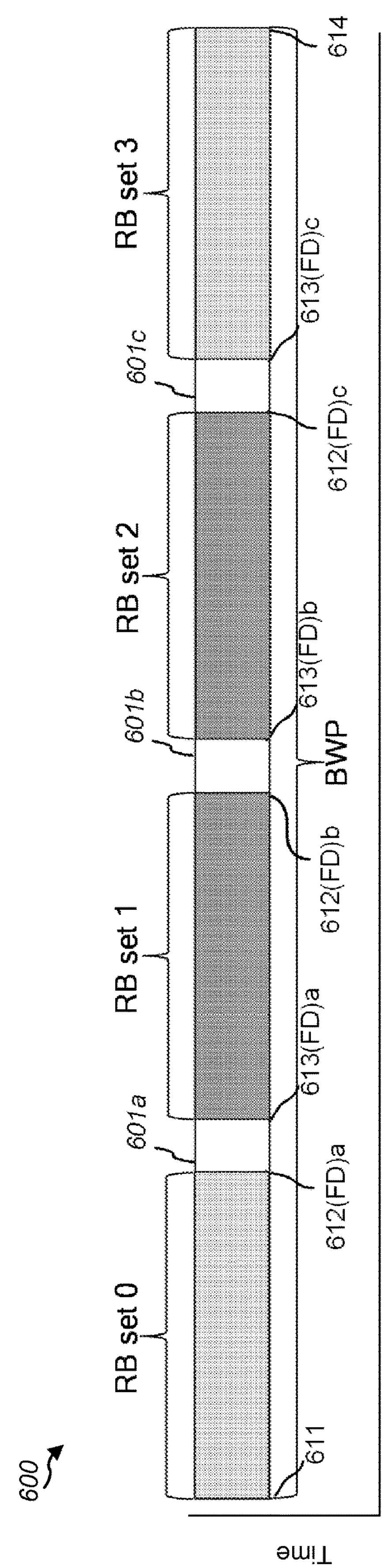
FIG. 6 is a block diagram illustrating an example of a BWP comprising a contiguous plurality of RBs in which intra-cell guard bands are defined between corresponding RB sets of a full duplex BWP configuration according to aspects of the present disclosure.

FIG. 6 shows an example of BWP 600 comprising a contiguous plurality of RBs in which intra-cell guard bands 601*a*-601*c* are defined between corresponding RB sets of the full duplex BWP configuration. The RBs of the RB sets may be configured according to various slot formats (e.g., RBs of a RB set configured for uplink symbols, RBs of a RB set configured for downlink symbols, and/or RBs of a RB set configured for a combination of uplink symbols and downlink symbols) for full duplex communication. One or more slot format information messages, such as provided in DCI fields, may be used to indicate the number of RB sets, the slot formats, etc. of a full duplex BWP configuration to a UE on a serving cell. As one example, the RBs of RB set 0 and RB set 3 may be configured for downlink symbols according to a full duplex slot configuration, and RBs of RB set 1 and RB set 2 may be configured for uplink symbols according to the full duplex slot configuration. RB set 0, RB set 1, RB set 2, and RB set 3 of BWP 600 comprise the RBs available for signal transmission, and thus correspond to the signal transmission bandwidths within the BWP full duplex configuration. In a situation in which BWP 600 is a subdivision of a shared radio frequency spectrum band component carrier, RB set 0, RB set 1, RB set 2, and RB set 3 correspond to the bandwidths for which LBT procedure may be performed prior to communicating in order to determine whether those portions of the shared channel are available.

Wireless devices (e.g., UEs 115) of wireless network 100 may be configured for a full duplex carrier using a full duplex guard band message (e.g., an intraCellGuardBandFD message), such as may be provided via RRC signaling. For example, a full duplex guard band message may be configured to give an intra-cell guard band allocation with respect to a full duplex BWP configuration in terms of $\{GB_{FD1}{}^{low}, GB_{FD1}{}^{high}\} \ldots, \{GB_{FDN-1}{}^{low}, GB_{FDN-1}{}^{high}\}$ where GB may be given by CRB index (e.g., $GB_{FD1}{}^{low}$ may correspond to CRB index 612(FD)a, $GB_{FD1}{}^{high}$ may correspond to CRB index 613(FD)a, $GB_{FD2}{}^{low}$ may correspond to CRB index 612(FD)b, $GB_{FD2}{}^{high}$ may correspond to CRB index 613(FD)b, $GB_{FD3}{}^{low}$ may correspond to CRB index 612(FD)c, and $GB_{FD3}{}^{high}$ may correspond to CRB index 613(FD)c of example BWP 600). Using such a full duplex guard band message, wireless devices of wireless network 100 may determine the number of RB sets (e.g., corresponding to LBT bandwidths) and the available PRBs in each RB set for a corresponding full duplex slot configured bandwidth part. For example, a UE may determine the number (N) of RB sets for a cell and the available PRBs in each RB set based at least in part on CRB indices of a full duplex guard band message (e.g., $[RB_{start}\, GB_1{}^{low}, -1]$ for RB set 0, $[GB_1{}^{high}+1, GB_2{}^{low}-1]$ for RB set 1, . . . $[GB_{N-1}{}^{high}+1, RB_{end}]$ for RB set N, where $RB_{start}$ and $RB_{end}$ correspond to starting and ending RB indices of the cell, respectively). In the example of FIG. 6, a UE may determine that the number of RB sets for BWP 600 is 4 (N=4) based upon determining RB set 0 comprising RBs $[RB_{start}\, GB_1{}^{low}, -1]$ (CRB index 611, CRB index 612(FD)a−1), RB set 1 comprising RBs $[GB_1{}^{high}+1, GB_2{}^{low}-1]$ (CRB index 613(FD)a+1, CRB index 612(FD)b−1), RB set 2 comprising $[GB_2{}^{high}+1, GB_3{}^{low}-1]$ (CRB index 613(FD)b+1, CRB index 612(FD)c−1), and RB set 3 comprising RBs $[GB_3{}^{high}+1, RB_{end}]$ (CRB index 613(FD)c+1, CRB index 614). The intra-cell guard bands separate RB sets, each defined by start and end CRB in this example, wherein the RB sets may each be configured for uplink symbols, for downlink symbols, or for a combination of uplink symbols and downlink symbols for full duplex communication utilizing BWP 600. The slot configurations for the RB sets may, for example, be established using slot configuration signaling (e.g., one or more DCI messages providing slot format indication information).

Figure 7:
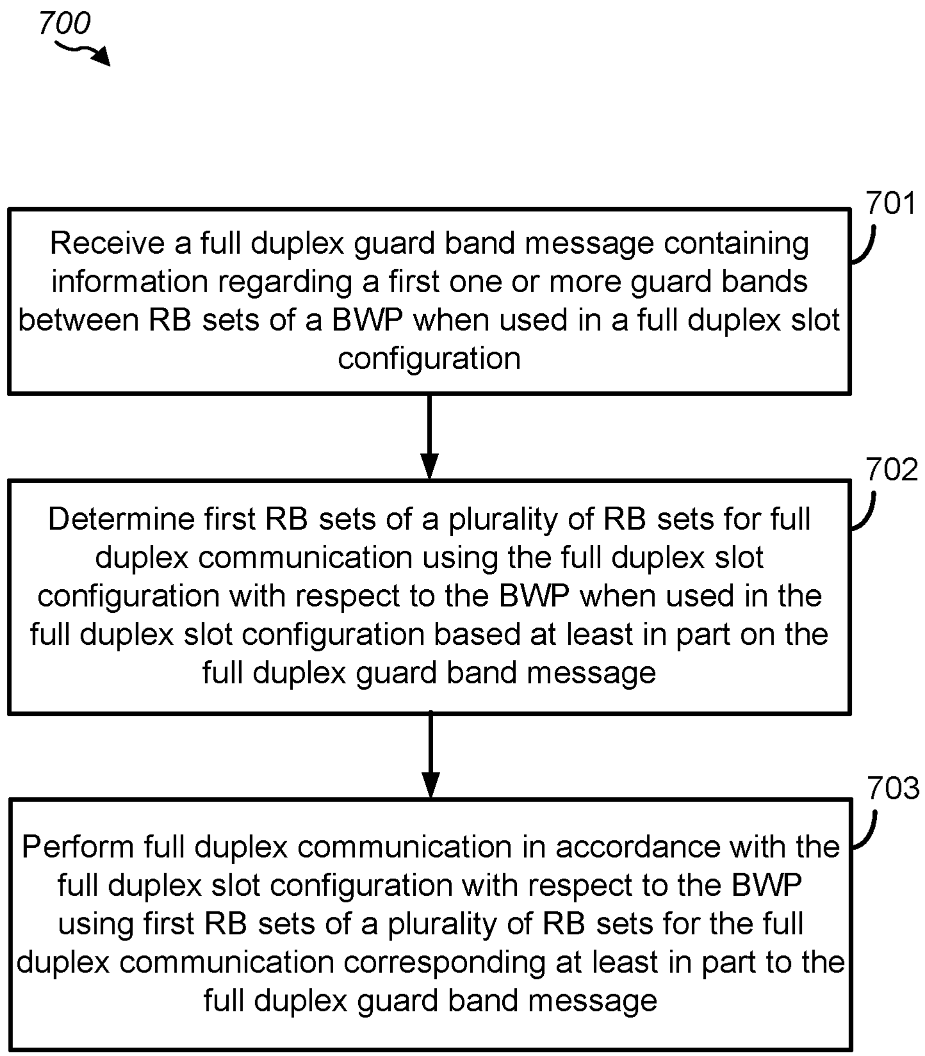
FIG. 7 is a block diagram illustrating example blocks executed by a wireless communication device implementing full duplex guard band logic with respect to a full duplex guard band message according to aspects of the present disclosure.

FIG. 7 is a block diagram illustrating example blocks executed by a wireless communication device of wireless network 100 implementing full duplex guard band logic with respect to a full duplex guard band message, such as to enable and provide guard bands for resource blocks of full duplex slot configured bandwidth parts, according to aspects of the present disclosure. For example, logic of UE 115 (e.g., code or instruction sets, such as in the form of software or firmware providing full duplex guard band logic, stored by memory 282 and executed by controller/processor 280) may perform or otherwise control full duplex guard band functions of flow 700 shown in FIG. 7.

In the example operation of flow 700 of FIG. 7, at block 701, a wireless device receives a full duplex guard band message containing information regarding a first one or more guard bands between RB sets of a BWP when used in a full duplex slot configuration. The full duplex guard band message may, for example, comprise an intraCellGuardBandFD message configured to give an intra-cell guard band allocation with respect to a full duplex BWP configuration. A full duplex guard band message may include a first plurality of low and high RB index pairs, wherein each low and high RB index pair of the first plurality of low and high RB index pairs may define a respective guard band of the full duplex slot configuration. In accordance with some aspects of the disclosure, a full duplex guard band message may be provided to a wireless device of wireless network 100 (e.g., UE 115) by another wireless device of wireless network 100 (e.g., base station 105), such as via RRC signaling. For example, base station 105, under control of controller/processor 240, may transmit a full duplex guard band message via transmit processor 220, TX MIMO processor 230, modulator/demodulators 232*a-t*, and antennas 254*a-r*. Correspondingly, UE 115, under control of controller/processor 280, may receive a full duplex guard band message via antennas 252*a-r*, modulator/demodulators 254*a-r*, MIMO detector 256, and receive processor 258.

At block 702 of flow 700, the wireless device determines first RB sets of a plurality of RB sets for full duplex communication using the full duplex slot configuration with respect to the BWP when used in the full duplex slot configuration based at least in part on the full duplex guard band message. For example, full duplex guard band logic executed by UE 115 may analyze information regarding intra-cell guard band allocation provided by the full duplex guard band message, such as to determine the number of RB sets and the available PRBs in each RB set for a corresponding full duplex slot configured bandwidth part. According to some examples, RB index pairs of the full duplex guard band message may define guard bands of the full duplex slot configuration regardless of a direction of RB sets of the full duplex slot configuration adjacent to the guard bands. For example, a low and high RB index pair of the RB index pairs of the full duplex guard band message may include a first RB index corresponding to a downlink RB index and a second RB index corresponding to an uplink RB index to define a guard band between a downlink RB set and an uplink RB set of the full duplex slot configuration. In accordance with some aspects of the disclosure, determining the RB sets for full duplex communication using the full duplex slot configuration may be based at least in part on a start RB index corresponding to a beginning RB of the BWP and an end RB index corresponding to an ending RB of the BWP.

The wireless device performs full duplex communication in accordance with the full duplex slot configuration with respect to the BWP using first RB sets of a plurality of RB sets for the full duplex communication corresponding at least in part to the full duplex guard band message at block 703 of flow 700. For example, the first RB sets determined based at least in part on the full duplex guard band message provide RB sets for the full duplex communication corresponding at least in part to the full duplex guard band message that may be used by the wireless device in performing full duplex communication according to some aspects of the disclosure. In accordance with some aspects of the disclosure, full duplex communication may be performed in accordance with the full duplex slot configuration using the RB sets for the full duplex communication by a wireless device of wireless network 100 (e.g., UE 115) with respect to another wireless device of wireless network 100 (e.g., base station 105). For example, UE 115, under control of controller/processor 280, may perform full duplex communication via antennas 252*a-r*, modulator/demodulators 254*a-r*, MIMO detector 256, receive processor 258, transmit processor 264, and transmit MIMO processor 266.

In accordance with some aspects of the disclosure, an intra-cell guard band allocation with respect to a full duplex BWP configuration may be determined using a half duplex guard band messages containing information regarding guard bands between RB sets of a BWP when used in a respective half duplex slot configuration. For example, an intraCellGuardBandUL-r16 message may contain information regarding one or more guard bands between RB sets in case of uplink half duplex operation and an intraCellGuardBandDL-r16 message may contain information regarding one or more guard bands between RB sets in case of downlink half duplex operation. In accordance with some aspects of the disclosure, the guard band allocations separately given by uplink and downlink guard band messages may be used to identify RB sets for a given direction of a full duplex BWP configuration. A guard band boundary with respect to RBs of a full duplex slot configured BWP may, for example, be obtained from the intraCellGuardBandDL-r16 message when the corresponding RB set on the same boundary is in the downlink direction, and may be obtained from the intraCellGuardBandUL-r16 message when the corresponding RB set on the same boundary is in the uplink direction.

Figure 8:
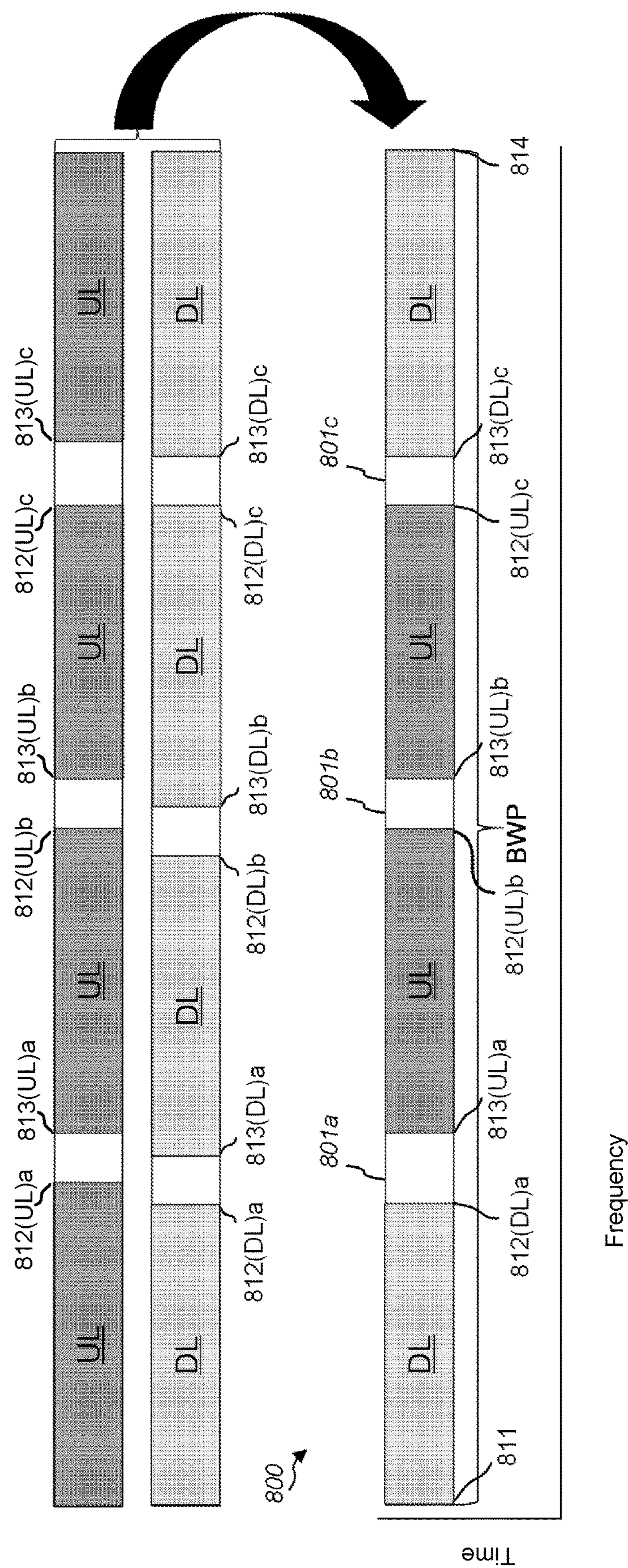
FIG. 8 is a block diagram illustrating an example of a BWP comprising a contiguous plurality of RBs in which intra-cell guard bands are defined between corresponding RB sets of the full duplex BWP configuration according to aspects of the present disclosure.

FIG. 8 shows an example of BWP 800 comprising a contiguous plurality of RBs in which intra-cell guard bands 801*a*-801*c* are defined between corresponding RB sets of the full duplex BWP configuration. The RBs of the RB sets may be configured according to various slot formats (e.g., RBs of a RB set configured for uplink symbols, RBs of a RB set configured for downlink symbols, and/or RBs of a RB set configured for a combination of uplink symbols and downlink symbols) for full duplex communication. One or more slot format information messages, such as provided in DCI fields, may be used to indicate the number of RB sets, the slot formats, etc. of a full duplex BWP configuration to a UE on a serving cell. As one example, the RBs of RB set 0 and RB set 3 may be configured for downlink symbols according to a full duplex slot configuration, and RBs of RB set 1 and RB set 2 may be configured for uplink symbols according to a full duplex slot configuration. RB set 0, RB set 1, RB set 2, and RB set 3 of BWP 800 comprise the RBs available for signal transmission, and thus correspond to the signal transmission bandwidths within the BWP full duplex configuration. In a situation in which BWP 800 is a subdivision of a shared radio frequency spectrum band component carrier, RB set 0, RB set 1, RB set 2, and RB set 3 correspond to the bandwidths for which LBT procedure may be performed prior to communicating in order to determine whether those portions of the shared channel are available.

Wireless devices (e.g., UEs 115) of wireless network 100 may be configured for a full duplex carrier using half duplex guard band messages (e.g., an intraCellGuardBandDL-r16 message and an intraCellGuardBandUL-r16 message), such as may be provided via RRC signaling. For example, an uplink half duplex guard band message may give an intra-cell guard band allocation in terms of $\{GB_{UL1}^{low}, GB_{UL1}^{high}\}$, $\{GB_{UL2}^{low}, GB_{UL2}^{high}\}$ . . . , $\{GB_{ULN\text{-}1}^{low}, GB_{ULN\text{-}1}^{high}\}$, where GB may be given by CRB index (e.g., $GB_{UL1}^{low}$ may correspond to CRB index 812(UL)a, $GB_{UL1}^{high}$ may correspond to CRB index 813(UL)a, $GB_{UL2}^{low}$ may correspond to CRB index 812(UL)b, $GB_{UL2}^{high}$ may correspond to CRB index 813(UL)b, $GB_{UL3}^{low}$ may correspond to CRB index 812(UL)c, and $GB_{UL3}^{high}$ may correspond to CRB index 813(UL)c of the example of FIG. 8). Similarly, a downlink half duplex guard band message may give an intra-cell guard band allocation in terms of $\{GB_{DL1}^{low}, GB_{DL1}^{high}\}$, $\{GB_{DL2}^{low}, GB_{DL2}^{high}\}$ . . . , $\{GB_{DLN\text{-}1}^{low}, GB_{DLN\text{-}1}^{high}\}$, where GB may be given by CRB index (e.g., $GB_{DL1}^{low}$ may correspond to CRB index 812(DL)a, $GB_{DL1}^{high}$ may correspond to CRB index 813(DL)a, $GB_{DL2}^{low}$ may correspond to CRB index 812(DL)b, $GB_{DL2}^{high}$ may correspond to CRB index 813 (DL)b, $GB_{DL3}^{low}$ may correspond to CRB index 812(DL)c, and $GB_{DL3}^{high}$ may correspond to CRB index 813(DL)c of the example of FIG. 8). Using such half duplex guard band messages, wireless devices of wireless network 100 may determine the available PRBs in each RB set for a full duplex slot configured bandwidth part. For example, a UE may determine the number (N) of RB sets (e.g., corresponding to LBT bandwidths) and their slot configuration using slot format information, such as provided in one or more DCI fields, for a full duplex BWP configuration. The UE may determine the available PRBs in each RB set based at least in part on CRB indices of the half duplex guard band messages (e.g., using a GB boundary from intraCellGuardBandDL-r16 when the corresponding RB set on the same boundary is in the downlink direction and using a GB boundary from intraCellGuardBandUL-r16 when the corresponding RB set on the same boundary is in the uplink direction). In the example of FIG. 8, a UE may determine that the number of RB sets for BWP 800 is 4 (N=4) and that RB set 0 is configured for downlink symbols, RB set 1 is configured for uplink symbols, RB set 2 is configured for uplink symbols, and RB set 3 is configured for downlink symbols according to a full duplex slot configuration (e.g., using slot format information for the full duplex BWP configuration). The UE may determine that RB set 0 comprises RBs $[RB_{start}, GB_{D1}^{low}, -1]$ (CRB index 811, CRB index 812(DL)a−1) based upon RB set 0 being configured for the downlink direction and using the corresponding GB boundaries from intraCellGuardBandDL-r16, that RB set 1 comprises RBs $[GB_{UL1}^{high}+1, GB_{UL2}^{low}-1]$ (CRB index 813(UL)a+1, CRB index 812(UL)b−1)based upon RB set 1 being configured for the uplink direction and using the corresponding GB boundaries from intraCellGuardBandUL-r16, that RB set 2 comprises $[GB_{UL2}^{high}+1, GB_{UL3}^{low}-1]$ (CRB index 813(UL)b+1, CRB index 812(UL)c−1)based upon RB set 2 being configured for the uplink direction and using the corresponding GB boundaries from intraCellGuardBandUL-r16, and that RB set 3 comprises RBs $[GB_{DL3}^{high}+1, RB_{end}]$ (CRB index 813(DL)c+1, CRB index 814)based upon RB set 3 being configured for the downlink direction and using the corresponding GB boundaries from intraCellGuardBandDL-r16. The intra-cell guard bands separate RB sets, each defined by start and end CRB in this example, wherein the RB sets may each be configured for uplink symbols, for downlink symbols, or for a combination of uplink symbols and downlink symbols for full duplex communication utilizing BWP 800.

Figure 9:
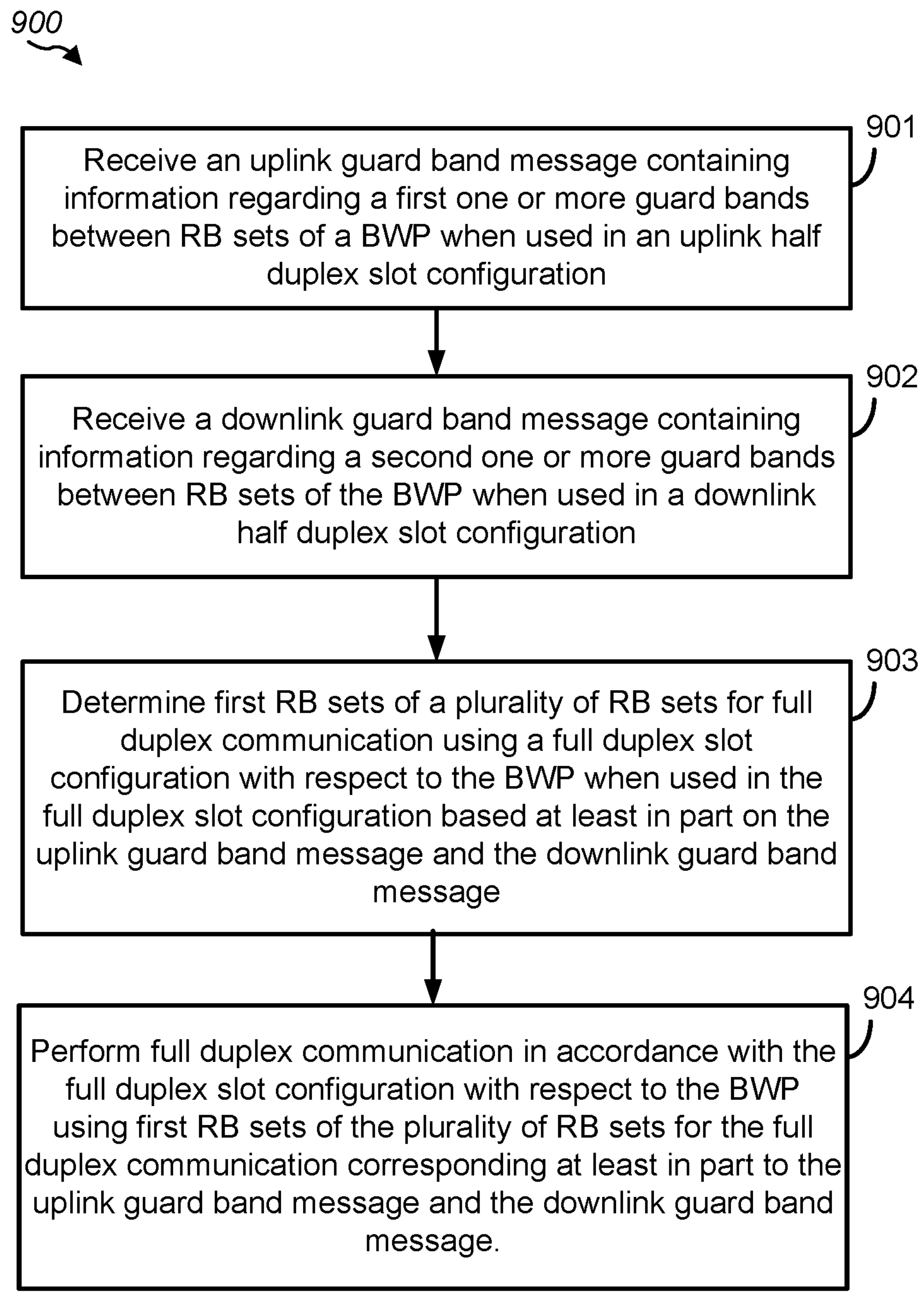
FIG. 9 is a block diagram illustrating example blocks executed by a wireless communication device implementing full duplex guard band logic with respect to half duplex guard band messages according to aspects of the present disclosure.

FIG. 9 is a block diagram illustrating example blocks executed by a wireless communication device of wireless network 100 implementing full duplex guard band logic with respect to half duplex guard band messages, such as to enable and provide guard bands for resource blocks of full duplex slot configured bandwidth parts, according to aspects of the present disclosure. For example, logic of UE 115 (e.g., code or instruction sets, such as in the form of software or firmware providing full duplex guard band logic, stored by memory 282 and executed by controller/processor 280) may perform or otherwise control full duplex guard band functions of flow 900 shown in FIG. 9.

In the example operation of flow 900 of FIG. 9, at block 901, a wireless device receives an uplink guard band message containing information regarding a first one or more guard bands between RB sets of a BWP when used in an uplink half duplex slot configuration. The uplink half duplex guard band message may, for example, comprise an intraCellGuardBandUL-r16 message configured to give an intra-cell guard band allocation with respect to an uplink half duplex BWP configuration. An uplink half duplex guard band message may include a first plurality of low and high RB index pairs, wherein each low and high RB index pair of the first plurality of low and high RB index pairs may define a respective guard band of the half duplex slot configuration. In accordance with some aspects of the disclosure, an uplink half duplex guard band message may be provided to a wireless device of wireless network 100 (e.g., UE 115) by another wireless device of wireless network 100 (e.g., base station 105), such as via RRC signaling. For example, base station 105, under control of controller/processor 240, may transmit a full duplex guard band message via transmit processor 220, TX MIMO processor 230, modulator/demodulators 232*a-t*, and antennas 254*a-r*. Correspondingly, UE 115, under control of controller/processor 280, may receive a full duplex guard band message via antennas 252*a-r*, modulator/demodulators 254*a-r*, MIMO detector 256, and receive processor 258.

At block 902, a wireless device receives a downlink guard band message containing information regarding a second one or more guard bands between RB sets of a BWP when used in a downlink half duplex slot configuration. The downlink half duplex guard band message may, for example, comprise a intraCellGuardBandDL-r16 message configured to give an intra-cell guard band allocation with respect to a downlink half duplex BWP configuration. A downlink half duplex guard band message may include a second plurality of low and high RB index pairs, wherein each low and high RB index pair of the second plurality of low and high RB index pairs may define a respective guard band of the downlink half duplex slot configuration. In accordance with some aspects of the disclosure, a downlink half duplex guard band message may be provided to a wireless device of wireless network 100 (e.g., UE 115) by another wireless device of wireless network 100 (e.g., base station 105), such as via RRC signaling. For example, base station 105, under control of controller/processor 240, may transmit a full duplex guard band message via transmit processor 220, TX MIMO processor 230, modulator/demodulators 232*a-t*, and antennas 254*a-r*. Correspondingly, UE 115, under control of controller/processor 280, may receive a full duplex guard band message via antennas 252*a-r*, modulator/demodulators 254*a-r*, MIMO detector 256, and receive processor 258.

At block 903 of flow 900, the wireless device determines first RB sets of a plurality of RB sets for full duplex communication using the full duplex slot configuration with respect to the BWP when used in the full duplex slot configuration based at least in part on the uplink guard band message and the downlink guard band message. For example, full duplex guard band logic executed by UE 115 may analyze information regarding intra-cell guard band allocation provided by the uplink half duplex guard band message and the downlink half duplex guard band message, such as to the available PRBs in each RB set for a corresponding full duplex slot configured bandwidth part. According to some examples, RB indices the half duplex guard band messages on a boundary corresponding to a RB set in the same direction (e.g., RB set RB uplink boundary or RB set RB downlink boundary) may define guard bands of the full duplex slot configuration. For example, a low and high RB index pair of a full duplex guard band may include a first RB index corresponding to a downlink RB index and a second RB index corresponding to an uplink RB index to define a guard band between a downlink RB set and an uplink RB set of the full duplex slot configuration. In accordance with some aspects of the disclosure, determining the RB sets for full duplex communication using the full duplex slot configuration may be based at least in part on a start RB index corresponding to a beginning RB of the BWP and an end RB index corresponding to an ending RB of the BWP.

The wireless device performs full duplex communication in accordance with the full duplex slot configuration with respect to the BWP using first RB sets of a plurality of RB sets for the full duplex communication corresponding at least in part to the uplink guard band message and the downlink guard band message at block 904 of flow 900. For example, the first RB sets determined based at least in part on the uplink guard band message and the downlink guard band message provide RB sets for the full duplex communication corresponding at least in part to the uplink guard band message and the downlink guard band message according to some aspects of the disclosure. In accordance with some aspects of the disclosure, full duplex communication may be performed in accordance with the full duplex slot configuration using the RB sets for the full duplex communication by a wireless device of wireless network 100 (e.g., UE 115) with respect to another wireless device of wireless network 100 (e.g., base station 105). For example, UE 115, under control of controller/processor 280, may perform full duplex communication via antennas 252*a-r*, modulator/demodulators 254*a-r*, MIMO detector 256, receive processor 258, transmit processor 264, and transmit MIMO processor 266.

Examples have been given above with respect to a full duplex slot configuration having 4 RB sets comprising 2 RB sets configured for downlink symbols and 2 RB sets configured for uplink symbols in order to aid in understand concepts of the present disclosure. It should be understood, however, that the concepts herein applicable to various full duplex slot configurations, such as may have different numbers and/or configurations of RB sets.

Figure 10A:
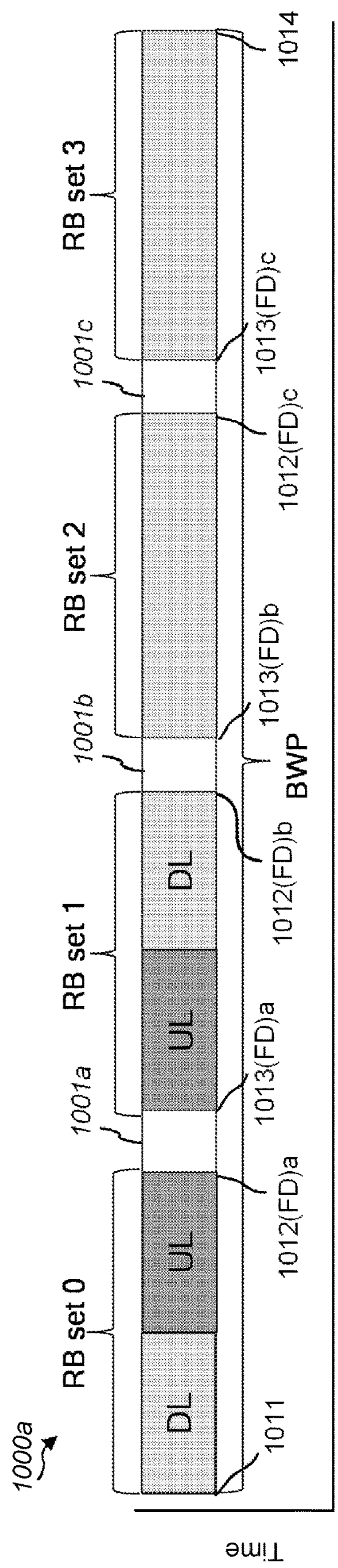
FIGS. 10A and 10B are block diagrams illustrating examples of a full duplex slot configuration including one or more RB sets that are split into portions configured for uplink symbols and for downlink symbols according to aspects of the present disclosure.
Figure 10B:
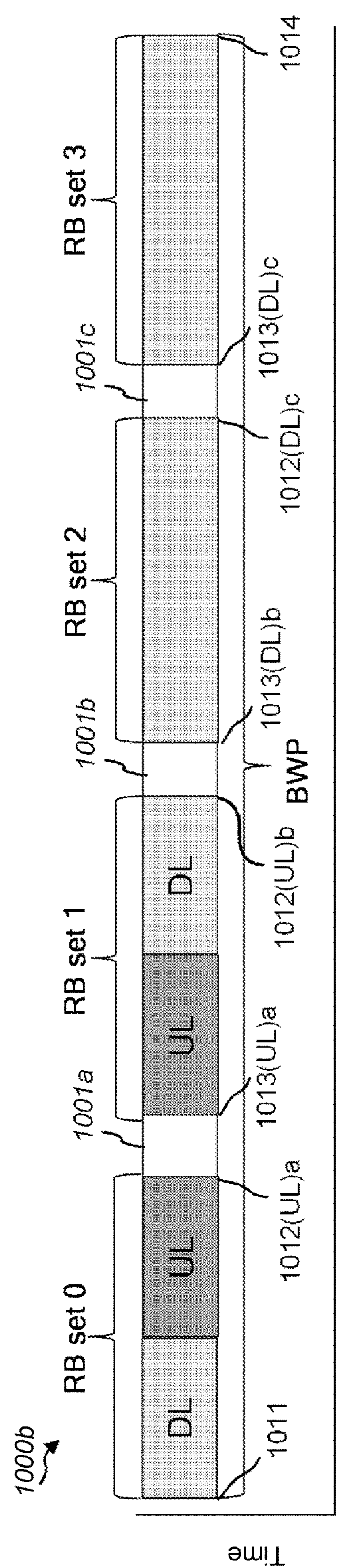

A full duplex slot configuration may, for example, include one or more RB sets that are split into portions configured for uplink symbols and for downlink symbols, as shown by RB set 0 and RB set 1 of FIGS. 10A and 10B. Guard bands of an intra-cell guard band allocation with respect to a full duplex BWP configuration in which one or more RB sets are split into a downlink and uplink RB set may be determined using a full duplex guard band message containing information regarding guard bands between RB sets of a BWP when used in a full duplex slot configuration. Additionally or alternatively, guard bands of an intra-cell guard band allocation with respect to a full duplex BWP configuration in which one or more RB sets is split into a downlink and uplink RB set may be determined using a half duplex guard band messages containing information regarding guard bands between RB sets of a BWP when used in a respective half duplex slot configuration.

In an example using a full duplex guard band message with respect to RB sets split into downlink and uplink RB sets, an intraCellGuardBandFD message according to aspects of the disclosure may contain information regarding one or more guard bands between the RB sets in case of full duplex operation regardless of the RB set direction configuration. FIG. 10A shows an example of BWP 1000*a* comprising a contiguous plurality of RBs in which intra-cell guard bands 1001*a*-1001*c* are defined between corresponding RB sets of the full duplex BWP configuration. In the example illustrated, RBs of RB set 0 and RB set 1 may be configured for downlink and uplink symbols according to a full duplex slot configuration, and the RBs of RB set 2 and RB set 3 may be configured for downlink symbols according to the full duplex slot configuration. One or more slot format information messages, such as provided in DCI fields, may be used to indicate the number of RB sets, the slot formats (e.g., including the uplink/downlink split), etc. of a full duplex BWP configuration to a UE on a serving cell. A UE may use a full duplex guard band message to determine that RB set 0 comprises RBs [$RB_{start}$, $GB_1^{low}$, −1] (CRB index 1011, CRB index 1012(FD)a−1), that RB set 1 comprises RBs [$GB_1^{high}$+1, $GB_2^{low}$−1] (CRB index 1013(FD)a+1, CRB index 1012(FD)b−1), that RB set 2 comprises [$GB_2^{high}$+1, $GB_3^{low}$−1] (CRB index 1013(FD)b+1, CRB index 1012(FD)c−1), and that RB set 3 comprises RBs [$GB_3^{high}$+1, $RB_{end}$] (CRB index 1013(FD)c+1, CRB index 1014), such as through operation according to functions of flow 700 of FIG. 7.

In an example using a half duplex guard band messages with respect to RB sets split into downlink and uplink RB sets, an intraCellGuardBandUL-r16 message may contain information regarding one or more guard bands between RB sets in case of uplink half duplex operation and an intraCellGuardBandDL-r16 message may contain information regarding one or more guard bands between RB sets in case of downlink half duplex operation. FIG. 10B shows an example of BWP 1000*b* comprising a contiguous plurality of RBs in which intra-cell guard bands 1001*a*-1001*c* are defined between corresponding RB sets of the full duplex BWP configuration. As with the example of FIG. 10A, RBs of RB set 0 and RB set 1 may be configured for downlink and uplink symbols according to a full duplex slot configuration, and the RBs of RB set 2 and RB set 3 may be configured for downlink symbols according to the full duplex slot configuration. One or more slot format information messages, such as provided in DCI fields, may be used to indicate the number of RB sets, the slot formats (e.g., including the uplink/downlink split), etc. of a full duplex BWP configuration to a UE on a serving cell. A UE may use the guard band allocations separately given by uplink and downlink guard band messages to identify RB sets for a given direction of a full duplex BWP configuration. A guard band boundary with respect to RBs of a full duplex slot configured BWP may, for example, be obtained from the intraCellGuardBandDL-r16 message when the corresponding RB set on the same boundary is in the downlink direction, and may be obtained from the intraCellGuardBandUL-r16 message when the corresponding RB set on the same boundary is in the uplink direction. A UE may determine that RB set 0 comprises RBs [$RB_{start}$, $GB_{UL1}^{low}$, −1] (CRB index 1011, CRB index 1012(UL)a−1) based upon RB set 0 being configured for a downlink/uplink split and using the corresponding GB boundaries from intraCellGuardBandDL-r16 and intraCellGuardBandUL-r16, that RB set 1 comprises RBs [$GB_{UL1}^{high}$+1, $GB_{DL2}^{low}$−1] (CRB index 1013(UL)a+1, CRB index 1012(DL)b−1) based upon RB set 1 being configured for an uplink/downlink split and using the corresponding GB boundaries from intraCellGuardBandUL-r16 and intraCellGuardBandDL-r16, that RB set 2 comprises [$GB_{DL2}^{high}$+1, $GB_{DL3}^{low}$−1] (CRB index 1013(DL)b+1, CRB index 1012(DL)c−1) based upon RB set 2 being configured for the downlink direction and using the corresponding GB boundaries from intraCellGuardBandDL-r16, and that RB set 3 comprises RBs [$GB_{DL3}^{high}$+1, $RB_{end}$] (CRB index 1013(DL)c+1, CRB index 814) based upon RB set 3 being configured for the downlink direction and using the corresponding GB boundaries from intraCellGuardBandDL-r16, such as through operation according to functions of flow 900 of FIG. 9.

Figure 11A:
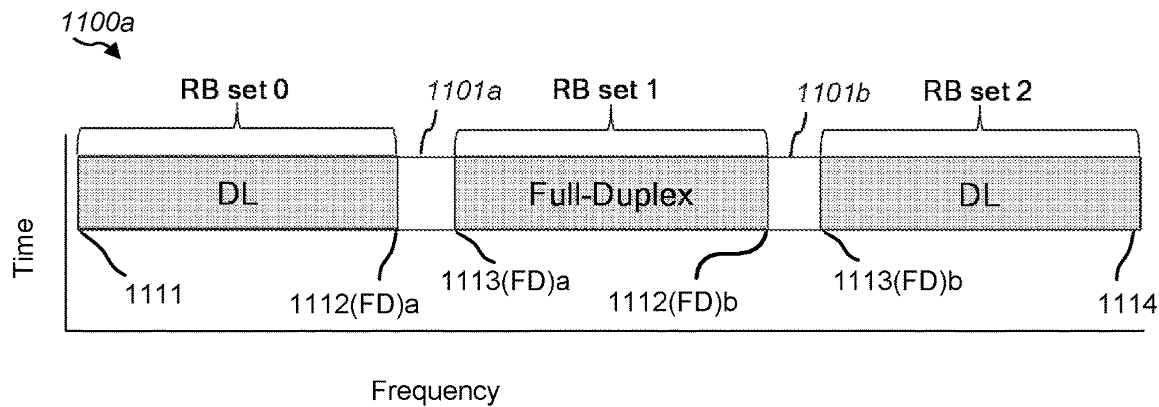
FIGS. 11A-11C are block diagrams illustrating examples of a full duplex slot configuration including one or more sets that are in-band full duplex RB sets according to aspects of the present disclosure.
Figure 11B:
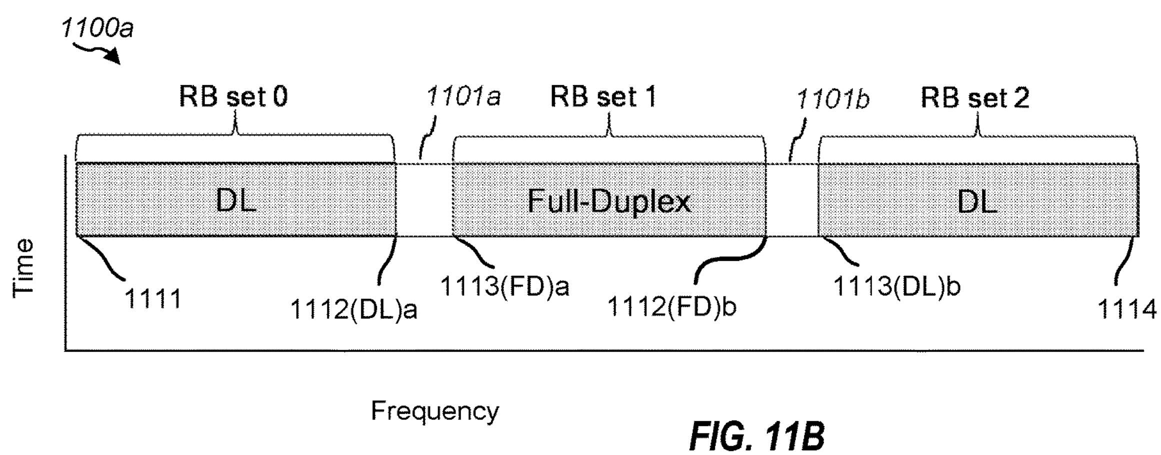
Figure 11C:
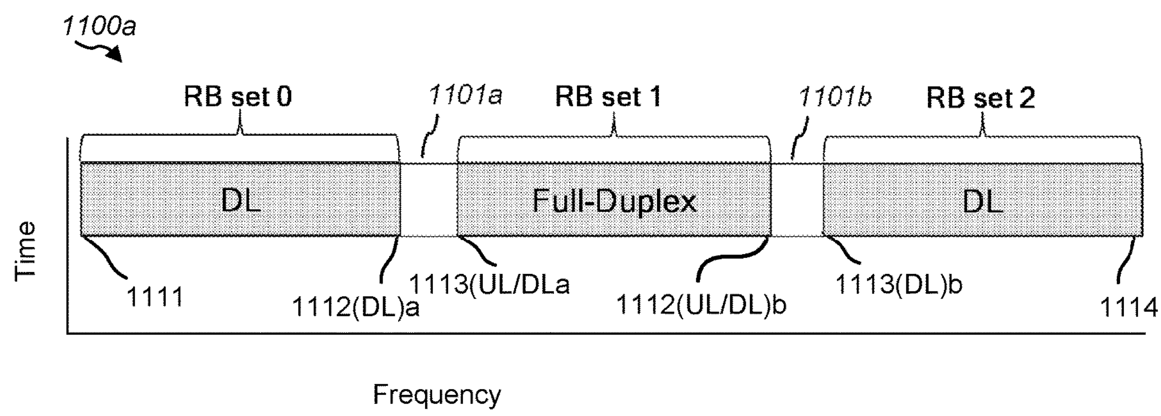

In another example, a full duplex slot configuration may include one or more RB sets that are in-band full duplex RB sets, as shown by RB set 1 of FIGS. 11A-11C. Guard bands of an intra-cell guard band allocation with respect to a full duplex BWP configuration in which one or more RB sets are in-band full duplex RB sets may be determined using a full duplex guard band message containing information regarding guard bands between RB sets of a BWP when used in a full duplex slot configuration. Additionally or alternatively, guard bands of an intra-cell guard band allocation with respect to a full duplex BWP configuration in which one or more RB sets are in-band full duplex RB sets may be determined using a half duplex guard band messages containing information regarding guard bands between RB sets of a BWP when used in a respective half duplex slot configuration.

In an example using a full duplex guard band message with respect to RB sets that are in-band full duplex sets, an intraCellGuardBandFD message according to aspects of the disclosure may contain information regarding one or more guard bands between the RB sets in case of full duplex operation regardless of the RB set direction configuration. FIG. 11A shows an example of BWP 1100*a* comprising a contiguous plurality of RBs in which intra-cell guard bands 1101*a* and 1101*b* are defined between corresponding RB sets of the full duplex BWP configuration. In the example illustrated, RBs of RB set 1 may be configured for in-band full duplex, and the RBs of RB set 0 and RB set 2 may be configured for downlink symbols. One or more slot format information messages, such as provided in DCI fields, may be used to indicate the number of RB sets, the slot formats (e.g., including in-band full duplex), etc. of a full duplex BWP configuration to a UE on a serving cell. A UE may use a full duplex guard band message to determine that RB set 0 comprises RBs [$RB_{start}$, $GB_1^{low}$, −1] (CRB index 1111, CRB index 1112(FD)a−1), that RB set 1 comprises RBs [$GB_1^{high}$+1, $GB_2^{low}$−1] (CRB index 1113(FD)a+1, CRB index 1112(FD)b−1), and that RB set 2 comprises [$GB_{DL2}^{high}$+1, $RB_{end}$] (CRB index 1113(FD)b+1, CRB index 1114), such as through operation according to functions of flow 700 of FIG. 7.

In a first example using a half duplex guard band messages with respect to RB sets split into downlink and uplink RB sets, an intraCellGuardBandUL-r16 message may contain information regarding one or more guard bands between RB sets in case of uplink half duplex operation, an intraCellGuardBandDL-r16 message may contain information regarding one or more guard bands between RB sets in case of downlink half duplex operation, and an intraCellGuardBandFD message according to aspects of the disclosure may contain information regarding one or more guard bands between the RB sets in case of full duplex operation regardless of the RB set direction configuration. FIG. 11B shows an example of BWP 1100*b* comprising a contiguous plurality of RBs in which intra-cell guard bands 1101*a* and 1101*b* are defined between corresponding RB sets of the full duplex BWP configuration. As with the example of FIG. 11A, RBs of RB set 1 may be configured for in-band full duplex, and the RBs of RB set 0 and RB set 2 may be configured for downlink symbols. One or more slot format information messages, such as provided in DCI fields, may be used to indicate the number of RB sets, the slot formats (e.g., including in-band full duplex), etc. of a full duplex BWP configuration to a UE on a serving cell. A UE may use the guard band allocations separately given by uplink and downlink half duplex guard band messages to identify RB sets for RB sets of a given direction and the guard band allocations given by a full duplex guard band message to identify RB sets for in-band full duplex RB sets of a full duplex BWP configuration. A guard band boundary with respect to RBs of a full duplex slot configured BWP may, for example, be obtained from the intraCellGuardBandDL-r16 message when the corresponding RB set on the same boundary is in the downlink direction, may be obtained from the intraCellGuardBandUL-r16 message when the corresponding RB set on the same boundary is in the uplink direction, and may be obtained from intraCellGuardBandFD when the corresponding RB set is an in-band full duplex RB set. A UE may determine that RB set 0 comprises RBs [$RB_{start}$, $GB_{DL1}{}^{low}$, −1] (CRB index 1111, CRB index 1112 (DL)a−1) based upon RB set 0 being configured for a downlink and using the corresponding GB boundaries from intraCellGuardBandDL-r16, that RB set 1 comprises RBs [$GB_{FD1}{}^{high}$+1, $GB_{FD2}{}^{low}$−1] (CRB index 1013(FD)a+1, CRB index 1012(FD)b−1) based upon RB set 1 being configured for in-band full duplex and using the corresponding GB boundaries from intraCellGuardBandFD, and that RB set 2 comprises [$GB_{DL2}{}^{high}$+1, $GB_{DL3}{}^{low}$−1] (CRB index 1013(DL)b+1, CRB index 1012(DL)c−1) based upon RB set 2 being configured for the downlink direction and using the corresponding GB boundaries from intraCellGuardBandDL-r16, such as through operation according to functions of flow 700 of FIG. 7 and flow 900 of FIG. 9.

In a second example using a half duplex guard band messages with respect to RB sets split into downlink and uplink RB sets, an intraCellGuardBandUL-r16 message may contain information regarding one or more guard bands between RB sets in case of uplink half duplex operation and an intraCellGuardBandDL-r16 message may contain information regarding one or more guard bands between RB sets in case of downlink half duplex operation. FIG. 11C shows an example of BWP 1100*c* comprising a contiguous plurality of RBs in which intra-cell guard bands 1101*a* and 1101*b* are defined between corresponding RB sets of the full duplex BWP configuration. As with the examples of FIGS. 11A and 11B, RBs of RB set 1 may be configured for in-band full duplex, and the RBs of RB set 0 and RB set 2 may be configured for downlink symbols. One or more slot format information messages, such as provided in DCI fields, may be used to indicate the number of RB sets, the slot formats (e.g., including in-band full duplex), etc. of a full duplex BWP configuration to a UE on a serving cell. A UE may use the guard band allocations separately given by uplink and downlink half duplex guard band messages to identify RB sets for RB sets of a given direction and the guard band allocations given by either the uplink or downlink half duplex guard band message to identify RB sets for in-band full duplex RB sets of a full duplex BWP configuration. A guard band boundary with respect to RBs of a full duplex slot configured BWP may, for example, be obtained from the intraCellGuardBandDL-r16 message when the corresponding RB set on the same boundary is in the downlink direction, may be obtained from the intraCellGuardBandUL-r16 message when the corresponding RB set on the same boundary is in the uplink direction, and may be obtained from either intraCellGuardBandDL-r16 or intraCellGuardBandUL-r16 when the corresponding RB set is an in-band full duplex RB set. A UE may determine that RB set 0 comprises RBs [$RB_{start}$, $GB_{DL1}{}^{low}$, −1] (CRB index 1111, CRB index 1112(DL)a−1) based upon RB set 0 being configured for a downlink and using the corresponding GB boundaries from intraCellGuardBandDL-r16, that RB set 1 comprises RBs [$GB_{UL/DL1}{}^{high}$+1, $GB_{UL/DL2}{}^{low}$−1] (CRB index 1013(UL/DL)a+1, CRB index 1012(UL/DL)b−1) based upon RB set 1 being configured for in-band full duplex and using the corresponding GB boundaries from either intraCellGuardBandUL-r16 or intraCellGuardBandDL-r16, and that RB set 2 comprises [$GB_{DL2}{}^{high}$+1, $GB_{DL3}{}^{low}$−1] (CRB index 1013(DL)b+1, CRB index 1012 (DL)c−1) based upon RB set 2 being configured for the downlink direction and using the corresponding GB boundaries from intraCellGuardBandDL-r16, such as through operation according to functions of flow 700 of FIG. 7 and flow 900 of FIG. 9.

Figure 12:
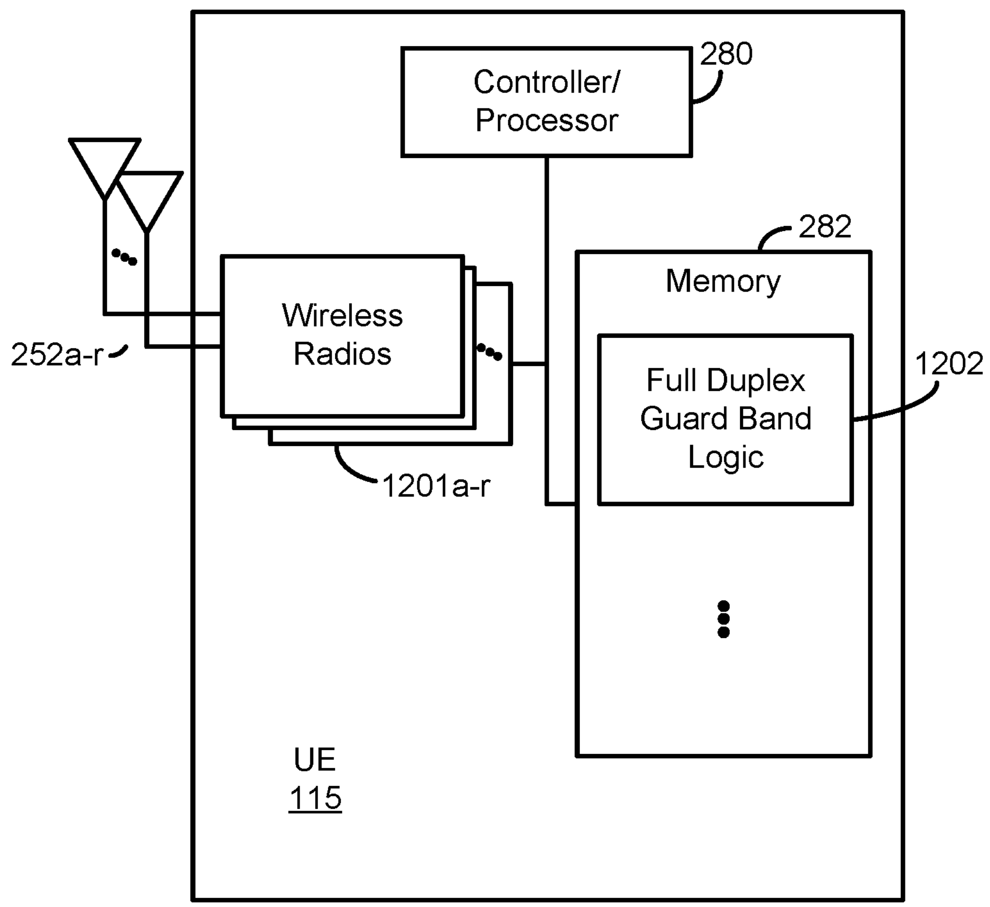
FIG. 12 is a block diagram conceptually illustrating a design of a UE configured to implement full duplex guard band logic according to aspects of the present disclosure.

FIG. 12 shows a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1201*a-r* and antennas 252*a-r*. Wireless radios 1201*a-r* include various components and hardware, as illustrated in FIG. 2 for UE 115, including modulator/demodulators 254*a-r*, MIMO detector 256, receive processor 258, transmit processor 264, and TX MIMO processor 266.

In the example of FIG. 12, UE 115 includes full duplex guard band logic 1202, such as may comprise logic for analyzing one or more full duplex guard band messages and/or one or more half duplex guard band messages, determining guard bands for resource blocks of full duplex slot configured bandwidth parts, and performing full duplex communication in accordance with a full duplex configuration using the resource blocks of full duplex slot configured bandwidth parts. Full duplex guard band logic 1202 may, for example, perform and/or control receiving and analyzing guard band messages and performing full duplex communication as discussed above with respect to flow 700 of FIG. 7 and/or flow 900 of FIG. 9.

Figure 13:
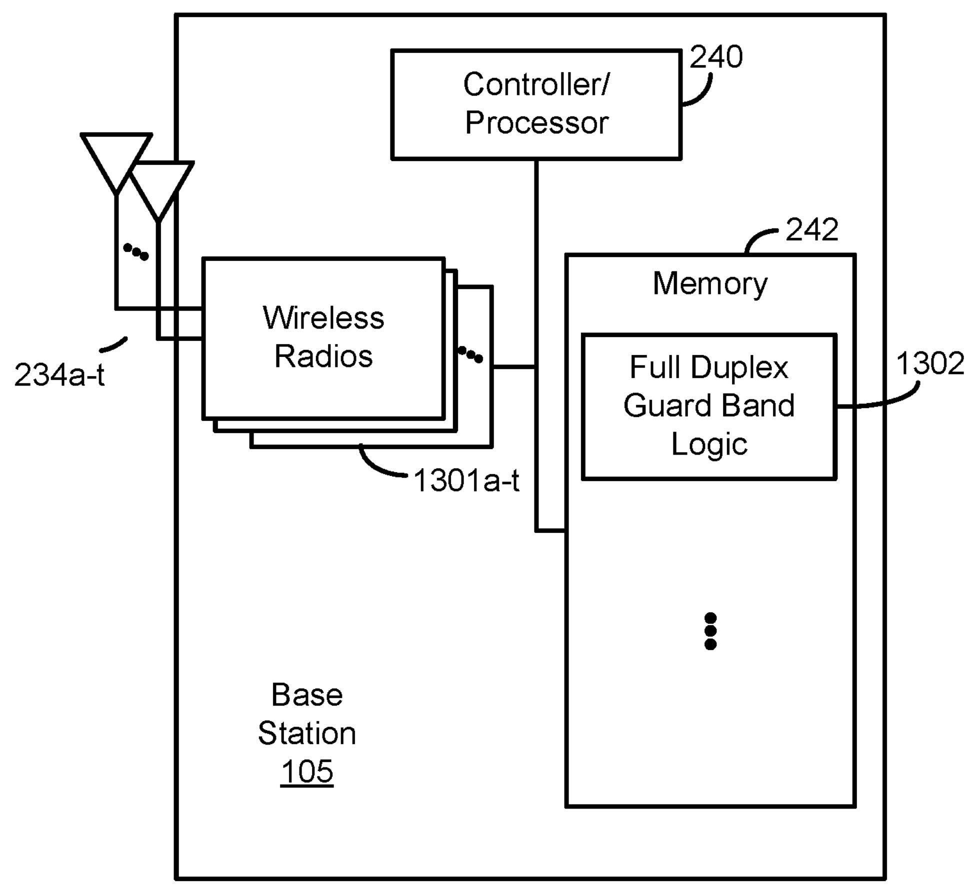
FIG. 13 is a block diagram conceptually illustrating a design of a base station configured to implement full duplex guard band logic according to some embodiments of the present disclosure.

FIG. 13 shows a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 1005, under control of controller/processor 240, transmits and receives signals via wireless radios 1301*a-t* and antennas 234*a-t*. Wireless radios 1301*a-t* include various components and hardware, as illustrated in FIG. 2 for base station 105, including modulator/demodulators 232*a-t*, MIMO detector 236, receive processor 238, transmit processor 220, and TX MIMO processor 230.

In the example of FIG. 13, base station 1005 includes full duplex guard band logic 1302, such as may comprise logic for allocating guard bands for resource blocks of full duplex slot configured bandwidth parts and providing one or more full duplex guard band messages and/or one or more half duplex guard band messages according to the guard band allocation(s). Full duplex guard band logic 1302 may, for example, perform and/or control transmission of one or more full duplex guard band messages and/or one or more half duplex guard band messages and performing full duplex communication as discussed above with respect to flow 700 of FIG. 7 and/or flow 900 of FIG. 9.

In some examples of methods, the apparatuses, and articles including non-transitory computer-readable medium described herein, various aspects of full duplex slot configuration may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for receiving a full duplex guard band message containing information regarding a first one or more guard bands between RB sets of a BWP when used in a full duplex slot configuration, wherein the full duplex guard band message includes a first plurality of low and high RB index pairs, and wherein each low and high RB index pair of the first plurality of low and high RB index pairs defines a respective guard band of the full duplex slot configuration, and performing full duplex communication in accordance with the full duplex slot configuration with respect to the BWP using first RB sets of a plurality of RB sets for the full duplex communication corresponding at least in part to the full duplex guard band message.

2. The methods, apparatuses, and articles of clause 1, wherein the low and high RB index pairs of the first plurality of low and high RB index pairs of the full duplex guard band message define the first one or more guard bands of the full duplex slot configuration regardless of a direction of the first RB sets adjacent to the respective guard band of the full duplex slot configuration.

3. The methods, apparatuses, and articles of any of clauses 1-2, wherein at least one low and high RB index pair of the first plurality of low and high RB index pairs of the full duplex guard band message includes a first RB index corresponding to a downlink RB index and a second RB index corresponding to an uplink RB index to define the respective guard band of the full duplex slot configuration between a downlink RB set and an uplink RB set of the full duplex slot configuration.

4. The methods, apparatuses, and articles of any of clauses 1-3, further providing for determining the first RB sets based at least in part on the full duplex guard band message.

5. The methods, apparatuses, and articles of clause 4, wherein the determining the first RB sets is further based at least in part on a start RB index corresponding to a beginning RB of the BWP and an end RB index corresponding to an ending RB of the BWP.

6. The methods, apparatuses, and articles of any of clauses 1-5, wherein the full duplex guard band message is received in RRC signaling.

7. The methods, apparatuses, and articles of any of clauses 1-6, wherein at least one RB set of the first RB sets defined by RB indices of the full duplex guard band message is split into a downlink and uplink RB set of the full duplex slot configuration.

8. The methods, apparatuses, and articles of any of clauses 1-7, wherein at least one RB set of the first RB sets is an in-band full duplex RB set, and wherein one or more RB indices of the first plurality of low and high RB index pairs are used in determining the in-band full duplex RB set.

9. The methods, apparatuses, and articles of any of clauses 1-8, further providing for receiving an uplink guard band message containing information regarding a second one or more guard bands between the RB sets of the BWP when used in an uplink half duplex slot configuration, wherein the uplink guard band message includes a second plurality of low and high RB index pairs, and wherein each low and high RB index pair of the second plurality of low and high RB index pairs defines a respective guard band of the uplink half duplex slot configuration, and receiving a downlink guard band message containing information regarding a third one or more guard bands between the RB sets of the BWP when used in a downlink half duplex slot configuration, wherein the downlink guard band message includes a third plurality of low and high RB index pairs, and wherein each low and high RB index pair of the third plurality of low and high RB index pairs defines a respective guard band of the downlink half duplex slot configuration, wherein at least one RB set of the plurality of RB sets for full duplex communication is an in-band full duplex RB set, wherein first RB indices of the first plurality of low and high RB index pairs are used in determining the in-band full duplex RB set, wherein second RB indices of the second plurality of low and high RB index pairs are used in determining an uplink RB set of the plurality of RB sets for full duplex communication, and wherein third RB indices of the third plurality of low and high RB index pairs are used in determining a downlink RB set of the plurality of RB sets for full duplex communication.

10. The methods, apparatuses, and articles of any of clauses 1-9, further providing for receiving an uplink guard band message containing information regarding a second one or more guard bands between the RB sets of the BWP when used in an uplink half duplex slot configuration, wherein the uplink guard band message includes a second plurality of low and high RB index pairs, and wherein each low and high RB index pair of the second plurality of low and high RB index pairs defines a respective guard band of the uplink half duplex slot configuration, and receiving a downlink guard band message containing information regarding a third one or more guard bands between the RB sets of the BWP when used in a downlink half duplex slot configuration, wherein the downlink guard band message includes a third plurality of low and high RB index pairs, and wherein each low and high RB index pair of the third plurality of low and high RB index pairs defines a respective guard band of the downlink half duplex slot configuration, wherein at least one RB set of the plurality of RB sets for full duplex communication is an in-band full duplex RB set, and wherein second RB indices of the second plurality of low and high RB index pairs or third RB indices of the third plurality of low and high RB index pairs are used in determining the in-band full duplex RB set.

11. Methods, apparatuses, and articles for wireless communication may provide for receiving an uplink guard band message containing information regarding a first one or more guard bands between RB sets of a BWP when used in an uplink half duplex slot configuration, wherein the uplink guard band message includes a first plurality of low and high RB index pairs, and wherein each low and high RB index pair of the first plurality of low and high RB index pairs defines a respective guard band of the uplink half duplex slot configuration, receiving a downlink guard band message containing information regarding a second one or more guard bands between the RB sets of the BWP when used in a downlink half duplex slot configuration, wherein the downlink guard band message includes a second plurality of low and high RB index pairs, and wherein each low and high RB index pair of the second plurality of low and high RB index pairs defines a respective guard band of the downlink half duplex slot configuration, and performing full duplex communication in accordance with a full duplex slot configuration with respect to the BWP using first RB sets of a plurality of RB sets for the full duplex communication corresponding at least in part to the uplink guard band message and the downlink guard band message.

12. The methods, apparatuses, and articles of clause 11, wherein at least one low and high RB index pair of the first plurality of low and high RB index pairs of the uplink guard band message includes a first RB index corresponding to an uplink RB index, wherein at least one low and high RB index pair of the second plurality of low and high RB index pairs of the downlink guard band message includes a second RB index corresponding to a downlink RB index, and wherein the first RB index and the second RB index define a respective guard band of the full duplex slot configuration between a downlink RB set and an uplink RB set of the full duplex slot configuration.

13. The methods, apparatuses, and articles of any of clauses 11-12, further providing for determining the first RB sets based at least in part on the uplink guard band message and the downlink guard band message.

14. The methods, apparatuses, and articles of clause 13, wherein the determining the first RB sets is further based at least in part on a start RB index corresponding to a beginning RB of the BWP and an end RB index corresponding to an ending RB of the BWP.

15. The methods, apparatuses, and articles of any of clauses 11-14, wherein the uplink guard band message and the downlink guard band message are received in RRC signaling.

16. The methods, apparatuses, and articles of any of clauses 11-15, wherein at least one RB set of the first RB sets defined by RB indices of the uplink guard band message and the downlink guard band message is split into a downlink and uplink RB set of the full duplex slot configuration.

17. The methods, apparatuses, and articles of any of clauses 11-16, wherein at least one RB set of the first RB sets is an in-band full duplex RB set, and wherein one or more RB indices of the first plurality of low and high RB index pairs are used in determining the in-band full duplex RB set.

18. The methods, apparatuses, and articles of any of clauses 11-17, further providing for receiving a full duplex guard band message containing information regarding a third one or more guard bands between the RB sets of the BWP when used in the full duplex slot configuration, wherein the full duplex guard band message includes a third plurality of low and high RB index pairs, and wherein each low and high RB index pair of the third plurality of low and high RB index pairs defines a respective guard band of the full duplex slot configuration, wherein at least one RB set of the plurality of RB sets for full duplex communication is an in-band full duplex RB set, wherein third RB indices of the third plurality of low and high RB index pairs are used in determining the in-band full duplex RB set, wherein first RB indices of the first plurality of low and high RB index pairs are used in determining an uplink RB set of the plurality of RB sets for full duplex communication, and wherein second RB indices of the second plurality of low and high RB index pairs are used in determining a downlink RB set of the plurality of RB sets for full duplex communication.

19. The methods, apparatuses, and articles of any of clauses 11-18, wherein at least one RB set of the plurality of RB sets for full duplex communication is an in-band full duplex RB set, and wherein first RB indices of the first plurality of low and high RB index pairs or second RB indices of the second plurality of low and high RB index pairs are used in determining the in-band full duplex RB set.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to full duplex guard bands may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 7 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:

receiving a full duplex guard band message containing information regarding a first one or more guard bands between resource block (RB) sets of a bandwidth part (BWP) when used in a full duplex slot configuration, wherein the full duplex guard band message includes a first plurality of low and high RB index pairs, and wherein each low and high RB index pair of the first plurality of low and high RB index pairs defines a respective guard band of the full duplex slot configuration; and performing full duplex communication in accordance with the full duplex slot configuration with respect to the BWP using first RB sets of a plurality of RB sets for the full duplex communication corresponding at least in part to the full duplex guard band message.

2. The method of claim 1, wherein the low and high RB index pairs of the first plurality of low and high RB index pairs of the full duplex guard band message define the first one or more guard bands of the full duplex slot configuration regardless of a direction of the first RB sets adjacent to the respective guard band of the full duplex slot configuration.

3. The method of claim 1, wherein at least one low and high RB index pair of the first plurality of low and high RB index pairs of the full duplex guard band message includes a first RB index corresponding to a downlink RB index and a second RB index corresponding to an uplink RB index to define the respective guard band of the full duplex slot configuration between a downlink RB set and an uplink RB set of the full duplex slot configuration.

4. The method of claim 1, further comprising:

determining the first RB sets based at least in part on the full duplex guard band message.

5. The method of claim 4, wherein the determining the first RB sets is further based at least in part on a start RB index corresponding to a beginning RB of the BWP and an end RB index corresponding to an ending RB of the BWP.

6. The method of claim 1, wherein at least one RB set of the first RB sets defined by RB indices of the full duplex guard band message is split into a downlink and uplink RB set of the full duplex slot configuration.

7. The method of claim 1, wherein at least one RB set of the first RB sets is an in-band full duplex RB set, and wherein one or more RB indices of the first plurality of low and high RB index pairs are used in determining the in-band full duplex RB set.

8. The method of claim 1, further comprising:

receiving an uplink guard band message containing information regarding a second one or more guard bands between the RB sets of the BWP when used in an uplink half duplex slot configuration, wherein the uplink guard band message includes a second plurality of low and high RB index pairs, and wherein each low and high RB index pair of the second plurality of low and high RB index pairs defines a respective guard band of the uplink half duplex slot configuration; and receiving a downlink guard band message containing information regarding a third one or more guard bands between the RB sets of the BWP when used in a downlink half duplex slot configuration, wherein the downlink guard band message includes a third plurality of low and high RB index pairs, and wherein each low and high RB index pair of the third plurality of low and high RB index pairs defines a respective guard band of the downlink half duplex slot configuration, wherein at least one RB set of the plurality of RB sets for full duplex communication is an in-band full duplex RB set, wherein first RB indices of the first plurality of low and high RB index pairs are used in determining the in-band full duplex RB set, wherein second RB indices of the second plurality of low and high RB index pairs are used in determining an uplink RB set of the plurality of RB sets for full duplex communication, and wherein third RB indices of the third plurality of low and high RB index pairs are used in determining a downlink RB set of the plurality of RB sets for full duplex communication.

9. The method of claim 1, further comprising:

receiving an uplink guard band message containing information regarding a second one or more guard bands between the RB sets of the BWP when used in an uplink half duplex slot configuration, wherein the uplink guard band message includes a second plurality of low and high RB index pairs, and wherein each low and high RB index pair of the second plurality of low and high RB index pairs defines a respective guard band of the uplink half duplex slot configuration; and receiving a downlink guard band message containing information regarding a third one or more guard bands between the RB sets of the BWP when used in a downlink half duplex slot configuration, wherein the downlink guard band message includes a third plurality of low and high RB index pairs, and wherein each low and high RB index pair of the third plurality of low and high RB index pairs defines a respective guard band of the downlink half duplex slot configuration, wherein at least one RB set of the plurality of RB sets for full duplex communication is an in-band full duplex RB set, and wherein second RB indices of the second plurality of low and high RB index pairs or third RB indices of the third plurality of low and high RB index pairs are used in determining the in-band full duplex RB set.

10. An apparatus configured for wireless communication, the apparatus comprising:

a memory; and at least one processor coupled to the memory, wherein the at least one processor is configured to:

receive a full duplex guard band message containing information regarding a first one or more guard bands between resource block (RB) sets of a bandwidth part (BWP) when used in a full duplex slot configuration, wherein the full duplex guard band message includes a first plurality of low and high RB index pairs, and wherein each low and high RB index pair of the first plurality of low and high RB index pairs defines a respective guard band of the full duplex slot configuration; and perform full duplex communication in accordance with the full duplex slot configuration with respect to the BWP using first RB sets of a plurality of RB sets for the full duplex communication corresponding at least in part to the full duplex guard band message.

11. The apparatus of claim 10, wherein at least one low and high RB index pair of the first plurality of low and high RB index pairs of the full duplex guard band message includes a first RB index corresponding to a downlink RB index and a second RB index corresponding to an uplink RB index to define the respective guard band of the full duplex slot configuration between a downlink RB set and an uplink RB set of the full duplex slot configuration.

12. The apparatus of claim 10, wherein the at least one processor is further configured to:

determine the first RB sets based at least in part on the full duplex guard band message.

13. The apparatus of claim 10, wherein at least one RB set of the first RB sets defined by RB indices of the full duplex guard band message is split into a downlink and uplink RB set of the full duplex slot configuration.

14. The apparatus of claim 10, wherein at least one RB set of the first RB sets is an in-band full duplex RB set, and wherein one or more RB indices of the first plurality of low and high RB index pairs are used in determining the in-band full duplex RB set.

15. The apparatus of claim 10, wherein the at least one processor is further configured to:

receive an uplink guard band message containing information regarding a second one or more guard bands between the RB sets of the BWP when used in an uplink half duplex slot configuration, wherein the uplink guard band message includes a second plurality of low and high RB index pairs, and wherein each low and high RB index pair of the second plurality of low and high RB index pairs defines a respective guard band of the uplink half duplex slot configuration; and receive a downlink guard band message containing information regarding a third one or more guard bands between the RB sets of the BWP when used in a downlink half duplex slot configuration, wherein the downlink guard band message includes a third plurality of low and high RB index pairs, and wherein each low and high RB index pair of the third plurality of low and high RB index pairs defines a respective guard band of the downlink half duplex slot configuration, wherein at least one RB set of the plurality of RB sets for full duplex communication is an in-band full duplex RB set, wherein first RB indices of the first plurality of low and high RB index pairs are used in determining the in-band full duplex RB set, wherein second RB indices of the second plurality of low and high RB index pairs are used in determining an uplink RB set of the plurality of RB sets for full duplex communication, and wherein third RB indices of the third plurality of low and high RB index pairs are used in determining a downlink RB set of the plurality of RB sets for full duplex communication.

16. The apparatus of claim 10, wherein the at least one processor is further configured to:

receive an uplink guard band message containing information regarding a second one or more guard bands between the RB sets of the BWP when used in an uplink half duplex slot configuration, wherein the uplink guard band message includes a second plurality of low and high RB index pairs, and wherein each low and high RB index pair of the second plurality of low and high RB index pairs defines a respective guard band of the uplink half duplex slot configuration; and receive a downlink guard band message containing information regarding a third one or more guard bands between the RB sets of the BWP when used in a downlink half duplex slot configuration, wherein the downlink guard band message includes a third plurality of low and high RB index pairs, and wherein each low and high RB index pair of the third plurality of low and high RB index pairs defines a respective guard band of the downlink half duplex slot configuration, wherein at least one RB set of the plurality of RB sets for full duplex communication is an in-band full duplex RB set, and wherein second RB indices of the second plurality of low and high RB index pairs or third RB indices of the third plurality of low and high RB index pairs are used in determining the in-band full duplex RB set.

17. A method of wireless communication, comprising:

receiving an uplink guard band message containing information regarding a first one or more guard bands between resource block (RB) sets of a bandwidth part (BWP) when used in an uplink half duplex slot configuration, wherein the uplink guard band message includes a first plurality of low and high RB index pairs, and wherein each low and high RB index pair of the first plurality of low and high RB index pairs defines a respective guard band of the uplink half duplex slot configuration;

receiving a downlink guard band message containing information regarding a second one or more guard bands between the RB sets of the BWP when used in a downlink half duplex slot configuration, wherein the downlink guard band message includes a second plurality of low and high RB index pairs, and wherein each low and high RB index pair of the second plurality of low and high RB index pairs defines a respective guard band of the downlink half duplex slot configuration; and performing full duplex communication in accordance with a full duplex slot configuration with respect to the BWP using first RB sets of a plurality of RB sets for the full duplex communication corresponding at least in part to the uplink guard band message and the downlink guard band message.

18. The method of claim 17, wherein at least one low and high RB index pair of the first plurality of low and high RB index pairs of the uplink guard band message includes a first RB index corresponding to an uplink RB index, wherein at least one low and high RB index pair of the second plurality of low and high RB index pairs of the downlink guard band message includes a second RB index corresponding to a downlink RB index, and wherein the first RB index and the second RB index define a respective guard band of the full duplex slot configuration between a downlink RB set and an uplink RB set of the full duplex slot configuration.

19. The method of claim 17, further comprising:

determining the first RB sets based at least in part on the uplink guard band message and the downlink guard band message.

20. The method of claim 19, wherein the determining the first RB sets is further based at least in part on a start RB index corresponding to a beginning RB of the BWP and an end RB index corresponding to an ending RB of the BWP.

21. The method of claim 17, wherein at least one RB set of the first RB sets defined by RB indices of the uplink guard band message and the downlink guard band message is split into a downlink and uplink RB set of the full duplex slot configuration.

22. The method of claim 17, wherein at least one RB set of the first RB sets is an in-band full duplex RB set, and wherein one or more RB indices of the first plurality of low and high RB index pairs are used in determining the in-band full duplex RB set.

23. The method of claim 17, further comprising:

receiving a full duplex guard band message containing information regarding a third one or more guard bands between the RB sets of the BWP when used in the full duplex slot configuration, wherein the full duplex guard band message includes a third plurality of low and high RB index pairs, and wherein each low and high RB index pair of the third plurality of low and high RB index pairs defines a respective guard band of the full duplex slot configuration, wherein at least one RB set of the plurality of RB sets for full duplex communication is an in-band full duplex RB set, wherein third RB indices of the third plurality of low and high RB index pairs are used in determining the in-band full duplex RB set, wherein first RB indices of the first plurality of low and high RB index pairs are used in determining an uplink RB set of the plurality of RB sets for full duplex communication, and wherein second RB indices of the second plurality of low and high RB index pairs are used in determining a downlink RB set of the plurality of RB sets for full duplex communication.

24. The method of claim 17, wherein at least one RB set of the plurality of RB sets for full duplex communication is an in-band full duplex RB set, and wherein first RB indices of the first plurality of low and high RB index pairs or second RB indices of the second plurality of low and high RB index pairs are used in determining the in-band full duplex RB set.

25. An apparatus configured for wireless communication, the apparatus comprising:

a memory; and at least one processor coupled to the memory, wherein the at least one processor is configured to:

receive an uplink guard band message containing information regarding a first one or more guard bands between resource block (RB) sets of a bandwidth part (BWP) when used in an uplink half duplex slot configuration, wherein the uplink guard band message includes a first plurality of low and high RB index pairs, and wherein each low and high RB index pair of the first plurality of low and high RB index pairs defines a respective guard band of the uplink half duplex slot configuration;

receive a downlink guard band message containing information regarding a second one or more guard bands between the RB sets of the BWP when used in a downlink half duplex slot configuration, wherein the downlink guard band message includes a second plurality of low and high RB index pairs, and wherein each low and high RB index pair of the second plurality of low and high RB index pairs defines a respective guard band of the downlink half duplex slot configuration; and perform full duplex communication in accordance with a full duplex slot configuration with respect to the BWP using first RB sets of a plurality of RB sets for the full duplex communication corresponding at least in part to the uplink guard band message and the downlink guard band message.

26. The apparatus of claim 25, wherein at least one low and high RB index pair of the first plurality of low and high RB index pairs of the uplink guard band message includes a first RB index corresponding to an uplink RB index, wherein at least one low and high RB index pair of the second plurality of low and high RB index pairs of the downlink guard band message includes a second RB index corresponding to a downlink RB index, and wherein the first RB index and the second RB index define a respective guard band of the full duplex slot configuration between a downlink RB set and an uplink RB set of the full duplex slot configuration.

27. The apparatus of claim 25, wherein at least one RB set of the first RB sets defined by RB indices of the uplink guard band message and the downlink guard band message is split into a downlink and uplink RB set of the full duplex slot configuration.

28. The apparatus of claim 25, wherein at least one RB set of the first RB sets is an in-band full duplex RB set, and wherein one or more RB indices of the first plurality of low and high RB index pairs are used in determining the in-band full duplex RB set.

29. The apparatus of claim 25, wherein the at least one processor is further configured to:

receive a full duplex guard band message containing information regarding a third one or more guard bands between the RB sets of the BWP when used in the full duplex slot configuration, wherein the full duplex guard band message includes a third plurality of low and high RB index pairs, and wherein each low and high RB index pair of the third plurality of low and high RB index pairs defines a respective guard band of the full duplex slot configuration, wherein at least one RB set of the plurality of RB sets for full duplex communication is an in-band full duplex RB set, wherein third RB indices of the third plurality of low and high RB index pairs are used in determining the in-band full duplex RB set, wherein first RB indices of the first plurality of low and high RB index pairs are used in determining an uplink RB set of the plurality of RB sets for full duplex communication, and wherein second RB indices of the second plurality of low and high RB index pairs are used in determining a downlink RB set of the plurality of RB sets for full duplex communication.

30. The apparatus of claim 25, wherein at least one RB set of the plurality of RB sets for full duplex communication is an in-band full duplex RB set, and wherein first RB indices of the first plurality of low and high RB index pairs or second RB indices of the second plurality of low and high RB index pairs are used in determining the in-band full duplex RB set.

* * * * *